(12) United States Patent
Madabhushi et al.

(10) Patent No.: US 11,645,753 B2
(45) Date of Patent: May 9, 2023

(54) DEEP LEARNING-BASED MULTI-SITE, MULTI-PRIMITIVE SEGMENTATION FOR NEPHROPATHOLOGY USING RENAL BIOPSY WHOLE SLIDE IMAGES

(71) Applicants: Case Western Reserve University, Cleveland, OH (US); The Cleveland Clinic Foundation, Cleveland, OH (US)

(72) Inventors: Anant Madabhushi, Shaker Heights, OH (US); Catherine Jayapandian, Strongsville, OH (US); Yijiang Chen, Cleveland, OH (US); Andrew Janowczyk, East Meadow, NY (US); John Sedor, Shaker Heights, OH (US); Laura Barisoni, Durham, NC (US)

(73) Assignees: Case Western Reserve University, Cleveland, OH (US); The Cleveland Clinic Foundation, Cleveland, OH (US)

( * ) Notice: Subject to any disclaimer, the term of this patent is extended or adjusted under 35 U.S.C. 154(b) by 174 days.

(21) Appl. No.: 17/032,617

(22) Filed: Sep. 25, 2020

(65) Prior Publication Data

US 2021/0158524 A1    May 27, 2021

Related U.S. Application Data

(60) Provisional application No. 62/941,030, filed on Nov. 27, 2019.

(51) Int. Cl.
*G06K 9/00* (2022.01)
*G06T 7/00* (2017.01)
(Continued)

(52) U.S. Cl.
CPC .............. *G06T 7/0014* (2013.01); *G06N 3/04* (2013.01); *G06N 3/08* (2013.01); *G06T 3/0006* (2013.01);
(Continued)

(58) Field of Classification Search
CPC ....... G06T 7/0014; G06T 3/0006; G06T 7/11; G06T 11/001; G06T 2207/20081;
(Continued)

(56) References Cited

U.S. PATENT DOCUMENTS

2020/0293748 A1* 9/2020 Avenel ................. G06V 10/454

FOREIGN PATENT DOCUMENTS

| CN | 109544561 A | * | 3/2019 | ............... G06T 7/11 |
| WO | WO-2011084548 A2 | * | 7/2011 | ............ C12Q 1/6883 |
| WO | WO-2018200715 A1 | * | 11/2018 | ......... G06K 9/00147 |

OTHER PUBLICATIONS

Ostermann et al. "Controversies in acute kidney injury: conclusions from a Kidney Disease: Improving Global Outcomes (KDIGO) Conference." Kidney International (2020) 98, 294-309, published on Apr. 26, 2020.

(Continued)

*Primary Examiner* — Xin Jia
(74) *Attorney, Agent, or Firm* — Eschweiler & Potashnik, LLC

(57) ABSTRACT

Embodiments discussed herein facilitate segmentation of histological primitives from stained histology of renal biopsies via deep learning and/or training deep learning model(s) to perform such segmentation. One example embodiment is configured to access a first histological image of a renal biopsy comprising a first type of histological primitives, wherein the first histological image is stained with a first type of stain; provide the first histological image to a first deep learning model trained based on the first type of (Continued)

histological primitive and the first type of stain; and receive a first output image from the first deep learning model, wherein the first type of histological primitives is segmented in the first output image.

25 Claims, 19 Drawing Sheets

(51) Int. Cl.
    *G06T 7/11*     (2017.01)
    *G06T 11/00*     (2006.01)
    *G06T 3/00*     (2006.01)
    *G06N 3/04*     (2023.01)
    *G06N 3/08*     (2023.01)

(52) U.S. Cl.
    CPC .............. *G06T 7/11* (2017.01); *G06T 11/001* (2013.01); *G06T 2207/20081* (2013.01); *G06T 2207/20084* (2013.01); *G06T 2207/30084* (2013.01); *G06T 2207/30096* (2013.01); *G06T 2207/30101* (2013.01)

(58) Field of Classification Search
    CPC .......... G06T 2207/20084; G06T 2207/30084; G06T 2207/30096; G06T 2207/30101; G06N 3/04; G06N 3/08; G06N 3/0454
    See application file for complete search history.

(56) References Cited

OTHER PUBLICATIONS

Flythe et al. "Blood pressure and volume management in dialysis: conclusions from a Kidney Disease: Improving Global Outcomes (KDIGO) Controversies Conference." Kidney International (2020) 97, 861-876, published on Mar. 8, 2020.

Habbous et al. "Evaluating multiple living kidney donor candidates simultaneously is more costeffective than sequentially." Kidney International, published on Jun. 30, 2020.

Xue et al. "Assessing the protective effect of remote ischemic preconditioning on acute kidney injury after coronary artery bypass grall surgery." Kidney International (2015) 88, 1195-1199, published on Nov. 1, 2015.

House et al. "Heart failure in chronic kidney disease: conclusions from a Kidney Disease: Improving Global Outcomes (KDIGO) Controversies Conference." Kidney International (2019) 95, 1304-1317, published on Apr. 30, 2019.

Glassock, Richard. "Evaluation of proteinuria redux." Kidney International (2016) 90, 938-940, published on Nov. 1, 2016.

Floege et al. "Management and treatment of glomerular diseases (part 1): conclusions from a Kidney Disease: Improving Global Outcomes (KDIGO) Controversies Conference." Kidney International (2019) 95, 268-280, published on Feb. 1, 2019.

Rovin et al. "Management and treatment of glomerular diseases (part 2): conclusions from a Kidney Disease: Improving Global Outcomes (KDIGO) Controversies Conference." Kidney International (2019) 95, 281-295, published on Feb. 1, 2019.

Eckardt et al. "Improving the prognosis of patients with severely decreased glomerular filtration rate (CKD G4D): conclusions from a Kidney Disease: Improving Global Outcomes (KDIGO) Controversies Conference." Kidney International (2018) 93, 1281-1292, published on Apr. 12, 2018.

Marwick et al. "Chronic kidney disease and valvular heart disease: conclusions from a Kidney Disease: Improving Global Outcomes (KDIGO) Controversies Conference." Kidney International (2019) 96, 836-849, published on Oct. 1, 2019.

* cited by examiner

| STAIN | H&E | | | | PAS | | | | SIL | | | | TRI | | | |
|---|---|---|---|---|---|---|---|---|---|---|---|---|---|---|---|---|
| Histologic Primitive | Optimal Mag | F-score | DSC | TPR | PPV | F-score | DSC | TPR | PPV | F-score | DSC | TPR | PPV | F-score | DSC | TPR | PPV |
| Glomerular tuft | 5X | 0.91 | 0.93 | 0.89 | 0.93 | 0.96 | 0.97 | 0.94 | 0.93 | 0.9 | 0.96 | 0.91 | 0.87 | 0.89 | 0.94 | 0.91 | 0.89 |
| Glomerular unit | 5X | 0.92 | 0.9 | 0.88 | 0.93 | 0.93 | 0.96 | 0.95 | 0.94 | 0.92 | 0.98 | 0.89 | 0.9 | 0.89 | 0.91 | 0.93 | 0.92 |
| Proximal Tubular Segment | 10X | 0.89 | 0.95 | 0.93 | 0.84 | 0.91 | 0.9 | 0.98 | 0.92 | 0.9 | 0.88 | 0.96 | 0.9 | 0.9 | 0.89 | 0.97 | 0.91 |
| Distal Tubular Segment | 10X | 0.78 | 0.78 | 0.83 | 0.8 | 0.93 | 0.92 | 0.96 | 0.93 | 0.91 | 0.93 | 0.89 | 0.9 | 0.81 | 0.82 | 0.8 | 0.84 |
| Peritubular Capillaries | 40X | - | - | - | - | 0.81 | 0.71 | 0.87 | 0.78 | - | - | - | - | - | - | - | - |
| Arteries /Arterioles | 10X | 0.83 | 0.85 | 0.84 | 0.83 | 0.85 | 0.9 | 0.93 | 0.82 | - | - | - | - | 0.79 | 0.86 | 0.89 | 0.86 |

FIG. 3

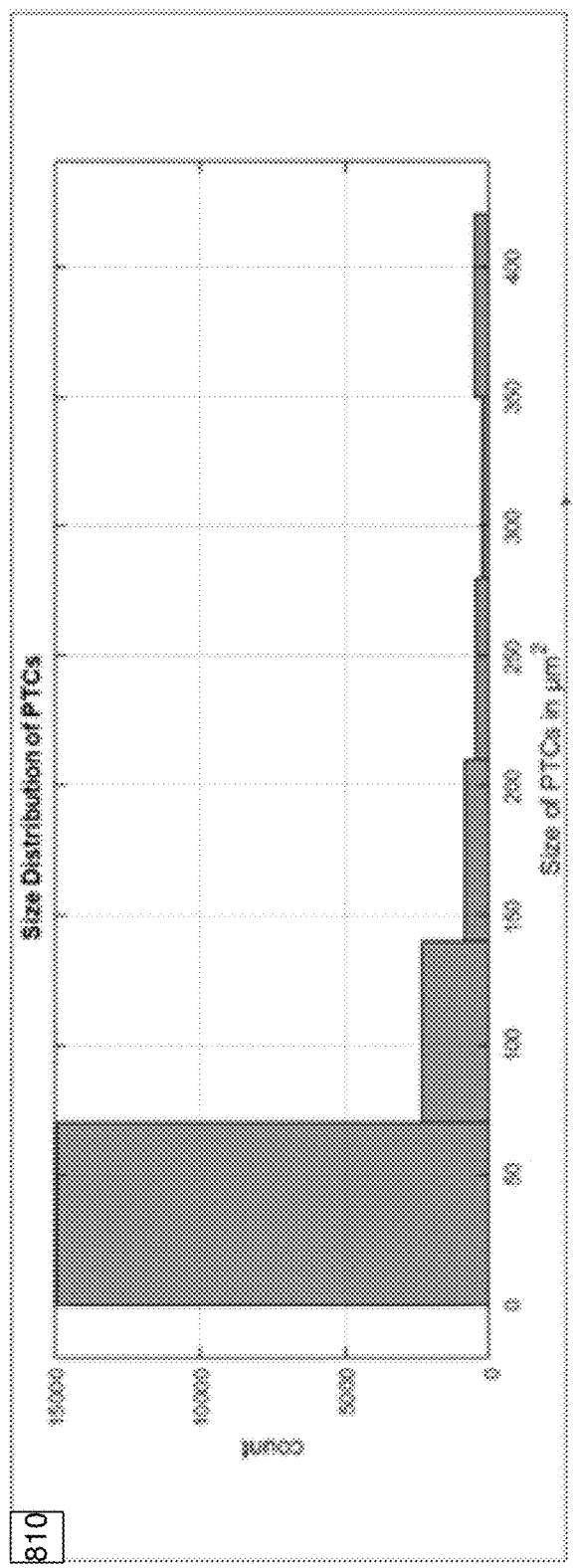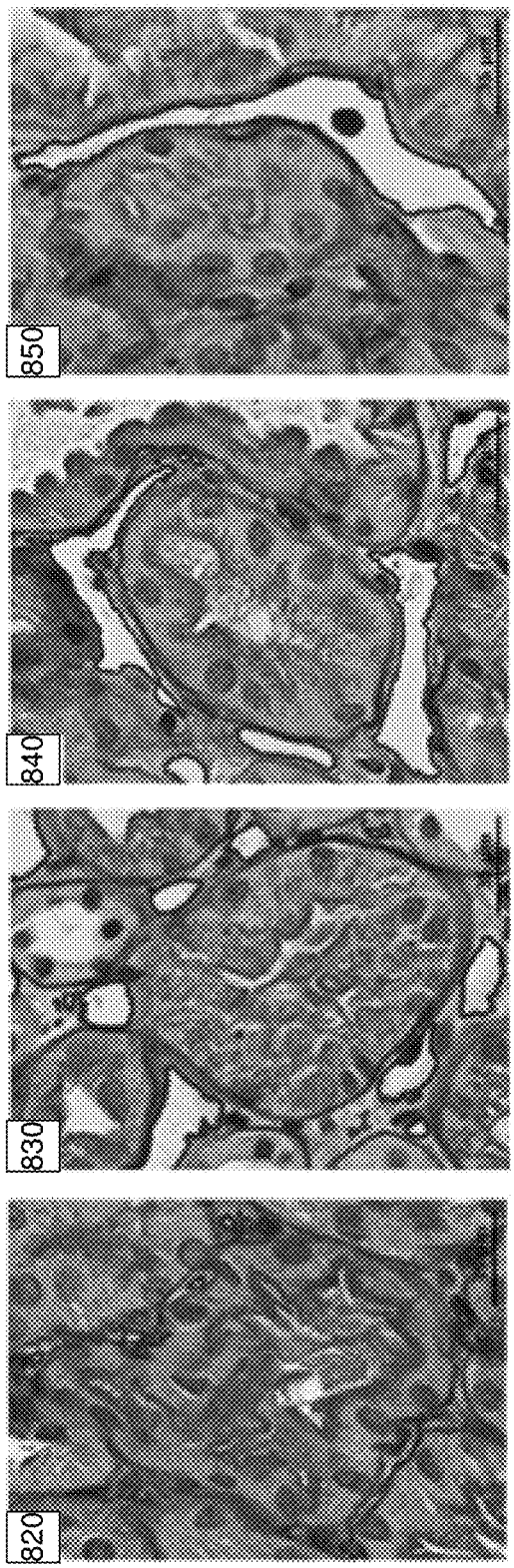
FIG. 8

| Artifact | PTC | | A/A | | GT | | PT | | DT | |
|---|---|---|---|---|---|---|---|---|---|---|
| | F-score | DSC | F-score | DSC | F-score | DSC | F-score | DSC | F-score | DSC |
| Glass | - | - | 0.67 | 0.94 | - | - | 0.70 | 0.75 | 0.76 | 0.82 |
| Scan | - | - | 1.00 | 0.99 | - | - | - | - | - | - |
| Section | 0.84 | 0.71 | 0.82 | 0.93 | 0.90 | 0.96 | 0.88 | 0.92 | 0.85 | 0.85 |
| None | 0.80 | 0.71 | 0.76 | 0.91 | 0.96 | 0.96 | 0.85 | 0.86 | 0.76 | 0.75 |

FIG. 11

| Site ID | A/A F-Score | A/A DSC | GT F-Score | GT DSC | PT F-Score | PT DSC | DT F-Score | DT DSC | PTC F-Score | PTC DSC |
|---|---|---|---|---|---|---|---|---|---|---|
| 1 | - | - | - | - | - | - | - | - | 0.91 | 0.88 |
| 2 | 0.71 | 0.92 | 1.0 | 0.96 | 0.86 | 0.80 | - | - | 0.50 | 0.75 |
| 3 | 0.77 | 0.96 | 1.0 | 0.96 | 0.93 | 0.91 | 0.63 | 0.67 | 0.80 | 0.89 |
| 4 | - | - | - | - | 0.88 | 0.94 | 0.78 | 0.83 | - | - |
| 5 | 0.50 | 0.99 | 1.0 | 0.97 | - | - | - | - | - | - |
| 6 | 0.72 | 0.78 | 0.93 | 0.91 | 0.68 | 0.78 | 0.78 | 0.75 | 0.70 | 0.70 |
| 7 | - | - | 1.0 | 0.94 | 0.93 | 0.93 | 0.67 | 0.65 | 0.67 | 0.83 |
| 8 | 0.92 | 0.97 | 0.80 | 0.99 | 0.88 | 0.94 | - | - | 0.52 | 0.58 |
| 9 | 0.76 | 0.93 | - | - | 0.87 | 0.92 | 0.83 | 0.79 | 0.78 | 0.90 |
| 10 | 0.49 | 0.97 | 0.78 | 0.94 | 0.81 | 0.66 | - | - | - | - |
| 11 | - | - | 1.0 | 0.95 | 0.91 | 0.94 | 0.90 | 0.86 | 0.50 | 0.50 |
| 12 | - | - | 0.92 | 0.99 | - | - | - | - | 0.56 | 0.83 |
| 13 | 1.0 | 0.92 | 0.90 | 0.98 | 0.89 | 0.91 | 0.79 | 0.86 | 0.60 | 0.71 |
| 14 | 1.0 | 0.97 | 0.81 | 0.86 | - | - | 0.76 | 0.82 | 0.64 | 0.79 |
| 15 | 0.95 | 0.75 | 1.0 | 0.96 | 0.70 | 0.75 | 0.86 | 0.79 | 0.76 | 0.84 |
| 16 | - | - | 1.0 | 0.99 | 0.89 | 0.86 | - | - | 0.62 | 0.77 |
| 17 | 1.0 | 0.90 | 1.0 | 0.93 | - | - | - | - | 0.77 | 0.82 |
| 18 | 0.40 | 0.93 | 0.96 | 0.95 | - | - | 0.85 | 0.86 | 0.73 | 0.86 |
| 19 | - | - | - | - | 0.93 | 0.91 | - | - | 0.62 | 0.80 |
| 20 | 1.0 | 0.97 | - | - | - | - | - | - | - | - |
| 21 | 0.79 | 0.93 | - | - | - | - | - | - | - | - |

FIG. 12

| Histologic Primitive for DL Segmentation | Stain | Number of manual segmentations | Number of images (3000x3000px) extracted from the WSIs |
|---|---|---|---|
| Glomeruli<br>- glomerular tuft,<br>- glomerular unit (tuft + Bowman's capsule) | H&E<br>PAS<br>SIL<br>TRI | 240<br>373<br>267<br>316 | Gl-150, Gl-150<br>Gl-228, Gl-204<br>Gl-124, Gl-124<br>Gl-138, Gl-137 |
| Proximal Tubular Segments | H&E<br>PAS<br>SIL<br>TRI | 1329<br>1021<br>891<br>828 | 108<br>66<br>102<br>94 |
| Distal Tubular Segments | H&E<br>PAS<br>SIL<br>TRI | 595<br>816<br>609<br>365 | 108<br>66<br>102<br>94 |
| Peritubular Capillaries | PAS | 19260 | 121 |
| Arteries/Arterioles | H&E<br>PAS<br>TRI | 1153<br>508<br>957 | 344<br>228<br>422 |

FIG. 14

DEEP LEARNING-BASED MULTI-SITE, MULTI-PRIMITIVE SEGMENTATION FOR NEPHROPATHOLOGY USING RENAL BIOPSY WHOLE SLIDE IMAGES

CROSS REFERENCE TO RELATED APPLICATIONS

This application claims the benefit of U.S. Provisional Patent Application No. 62/941,030 filed Nov. 27, 2019, entitled "DEEP LEARNING-BASED MULTI-SITE, MULTI-PRIMITIVE SEGMENTATION FOR NEPHROPATHOLOGY USING RENAL BIOPSY WHOLE SLIDE IMAGES", the contents of which are herein incorporated by reference in their entirety.

FEDERAL FUNDING NOTICE

This invention was made with government support under the grant DK747033 awarded by the National Institute of Diabetes, Digestive and Kidney Disorders. The government has certain rights in the invention.

BACKGROUND

Renal biopsy interpretation remains the gold standard for the diagnosis and staging of native and transplant kidney diseases. While visual morphologic assessment of the renal parenchyma may provide useful information for disease categorization, manual assessment and visual quantification by pathologists are time consuming and limited by poor intra- and inter-reader reproducibility.

The introduction of digital pathology in nephrology clinical trials has provided an unprecedented opportunity to test machine learning approaches for large scale tissue quantification efforts. Standardization of pathology material acquisition has allowed world-wide consortia to establish digital pathology repositories (DPRs) containing thousands of digital renal biopsies for the evaluation of kidney diseases in adults and children, across diverse populations and pathology laboratories. This large-scale quantification, however, presents some new challenges. Unlike cancer pathology where hematoxylin and eosin (H&E) is generally the sole stain employed, renal biopsies require routine special stains such as Jones and periodic acid-methenamine silver (SIL), periodic acid Schiff (PAS), and Masson trichrome (TRI). Additionally, the multicenter nature of such consortia is reflected in the heterogeneity of preparations (e.g., integrity of tissue sections and quality of the stains).

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

FIG. 3 illustrates a table showing deep learning performance metrics of the example study for structurally normal histological primitives at optimal digital magnification, in connection with various aspects discussed herein.

FIG. 8 illustrates a chart showing Deep Learning (DL) Segmentation performance in relation to the morphologic heterogeneity of peritubular capillaries along with four example images, in connection with various aspects discussed herein.

FIG. 11 illustrates a table showing performance of peritubular capillaries (PTC), arteries/arterioles (A/A), glomerular tufts (GT), proximal tubules (PT) and distal tubules (DT) deep learning models using WSIs generated at different pathology laboratories, in connection with various aspects discussed herein.

FIG. 12 illustrates a table showing the performance of Peritubular Capillaries (PTC), Arteries/Arterioles (A/A), Glomerular Tuft (GT), Proximal Tubules (PT) and Distal Tubules (DT) deep learning models in the presence of different types of artifacts caused by scanning issues, glass slide preparation and digitization and tissue section presentation, in connection with various aspects discussed herein.

FIG. 14 illustrates a table of the deep learning dataset from the example study, in connection with various aspects discussed herein.

DETAILED DESCRIPTION

Figure 1:
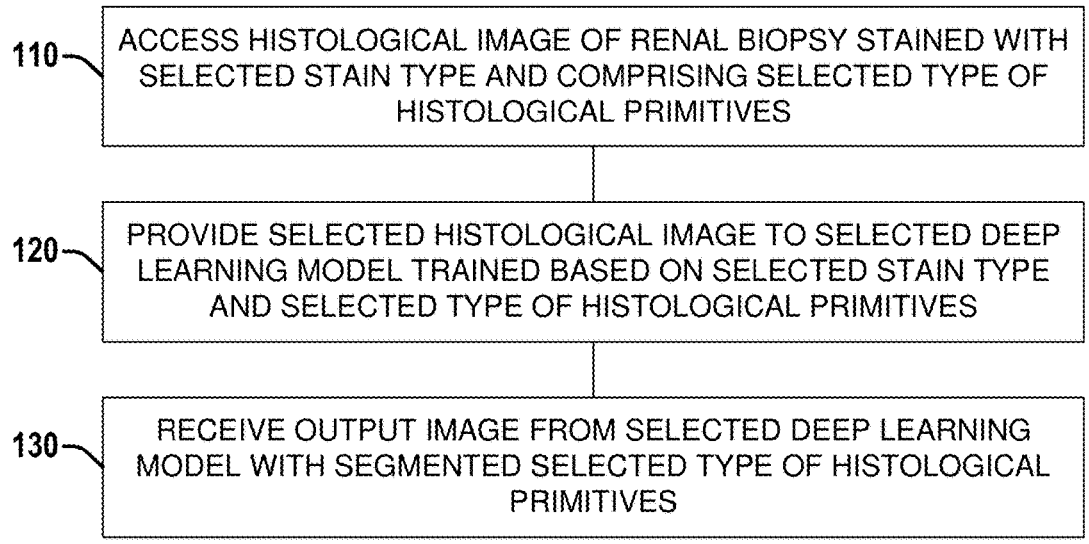
FIG. 1 illustrates a flow diagram of an example method/set of operations that can be performed by one or more processors to employ a deep learning model to segment a specific type of histological primitive on a histological image of a renal biopsy stained with a selected stain type, according to various embodiments discussed herein.

Various embodiments discussed herein can train and/or employ trained deep learning models to segment histological primitives from stained histological images of renal biopsies. Various embodiments can train and/or employ one or more deep learning models, wherein each deep learning model can be trained to segment a specific type of histological primitive on a histology slide with a specific stain type. Some embodiments can combine information from two or more deep learning models to obtain better segmentation results than from a single deep learning model. Various embodiments can employ other techniques discussed herein to facilitate training and/or employing deep learning models, including optimal magnifications for training and/or employing deep learning models depending on type of histological primitive, data augmentation to improve model performance due to variation in spatial invariance, robustness to deformations, and stain-variations, etc.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Referring to FIG. 1, illustrated is a flow diagram of an example method/set of operations 100 that can be performed by one or more processors to employ a deep learning model to segment a specific type of histological primitive on a histological image of a renal biopsy stained with a selected stain type, according to various embodiments discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing a histological image of a renal biopsy stained with a selected stain type and comprising a selected type of histological primitives. In various embodiments and in the example study discussed below, the histological image can be obtained via a system and/or apparatus implementing the set of operations 100, or can be obtained from a separate medical imaging system (e.g., optical microscopy system, etc.). Additionally, the histological image can be accessed contemporaneously with or at any point prior to performing the set of operations 100.

The set of operations 100 can further comprise, at 120, providing the histological image to a deep learning model trained to segment the selected type of histological primitives on histological images stained with the selected stain type.

The set of operations 100 can further comprise, at 130, receiving an output image from the deep learning model that comprises a segmentation of the first type of histological primitives on the histological image.

In various embodiments, operations 110-130 can be repeated one or more additional times, with a (second, third, etc.) histological image of a renal biopsy stained with a (second, third, etc.) selected stain type and comprising a (second, third, etc.) selected type of histological primitives being provided to a (second, third, etc.) deep learning model, wherein the deep learning model and at least one of the selected stain type and selected type of histological primitive differ on each additional repetition of operations 110-130.

Additionally or alternatively, set of operations 100 can comprise one or more other actions discussed herein in connection with employing one or more deep learning models to segment one or more types of histological primitives on one or more histological images of a renal biopsy stained with one or more stain types.

Figure 2:
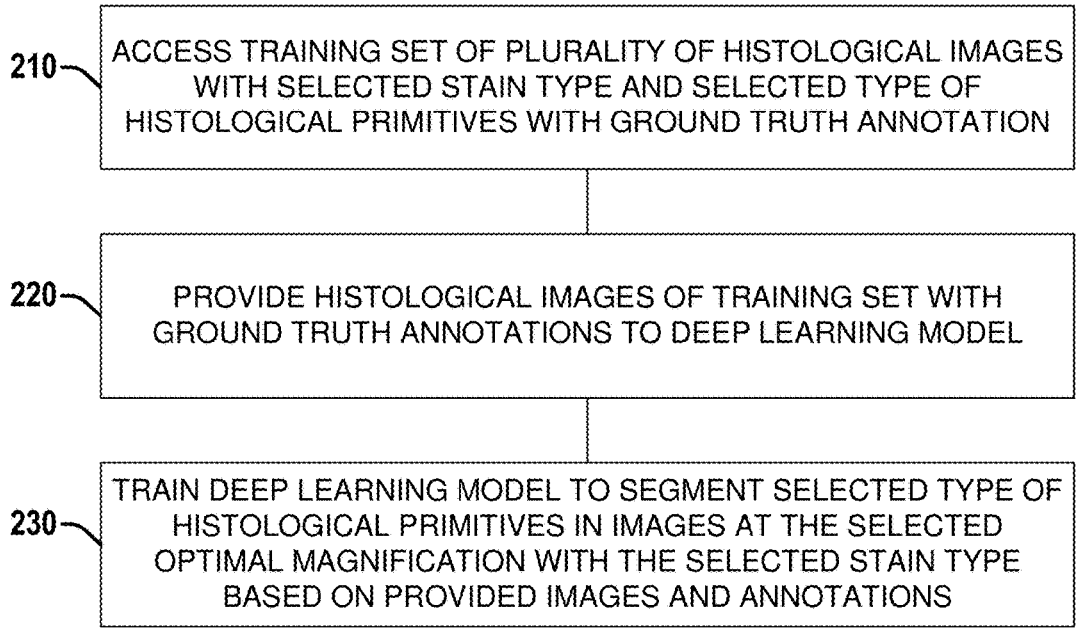
FIG. 2 illustrates a flow diagram of an example method/set of operations that can be performed by one or more processors to train a deep learning model to segment a specific type of histological primitive on a histological image of a renal biopsy stained with a selected stain type, according to various embodiments discussed herein.

Referring to FIG. 2, illustrated is a flow diagram of an example method/set of operations 200 that can be performed by one or more processors to train a deep learning model to segment a specific type of histological primitive on a histological image of a renal biopsy stained with a selected stain type, according to various aspects discussed herein.

The set of operations 200 can comprise, at 210, accessing a training set of histological images of renal biopsies of patients that have a selected stain type and have a selected type of histological primitives along with ground truth annotations segmenting the selected type of histological primitives on the histological images, each of which can be at a selected optimal magnification for the selected type of histological primitive. In various embodiments and in the example study discussed below, the histological images can be obtained via a system and/or apparatus implementing the set of operations 200, or can be obtained from a separate medical imaging system (e.g., optical microscope). Additionally, the histological images can be accessed contemporaneously with or at any point prior to performing the set of operations 200.

The set of operations 200 can further comprise, at 220, providing the histological images and associated ground truth annotations to a deep learning model.

The set of operations 200 can further comprise, at 230, training the deep learning model based on the histological images and associated ground truth annotations to segment the selected type of histological primitive on histological images at the selected optimal magnification that are stained with the selected stain type.

Additionally or alternatively, set of operations 200 can comprise one or more other actions discussed herein in connection with training a model to segment a selected type of histological primitives on histological slides with a selected stain type (e.g., data augmentation techniques discussed herein, etc.).

Additional aspects and embodiments are discussed below in connection with the following example study.

Example Study: Development and Evaluation of Deep Learning-Based Segmentation of Histologic Structures in the Kidney Cortex with Multiple Histologic Stains The following discussion provides example embodiments in connection with an example study involving training and/or employing deep learning models to segment a selected type of histological primitive on a histological image stained with a selected stain type.

The application of deep learning for automated segmentation (delineation of boundaries) of histologic primitives (structures) from whole slide images can facilitate the establishment of novel protocols for kidney biopsy assessment. The example study developed and validated deep learning networks for the segmentation of histologic structures on kidney biopsies and nephrectomies. For development, the example study examined 125 biopsies for Minimal Change Disease (MCD) collected across 29 NEPTUNE enrolling centers along with 459 whole slide images stained with Hematoxylin & Eosin (125), Periodic Acid Schiff (125), Silver (102), and Trichrome (107) divided into training, validation and testing sets (ratio 6:1:3). Histologic structures were manually segmented (30048 total annotations) by five nephropathologists. Twenty deep learning models were trained with optimal digital magnification across the structures and stains. Periodic Acid Schiff-stained whole slide images yielded the best concordance between pathologists and deep learning segmentation across all structures (F-scores: 0.93 for glomerular tufts, 0.94 for glomerular tuft plus Bowman's capsule, 0.91 for proximal tubules, 0.93 for distal tubular segments, 0.81 for peritubular capillaries, and 0.85 for arteries and afferent arterioles). Optimal digital magnifications were 5× for glomerular tuft/tuft plus Bowman's capsule, 10× for proximal/distal tubule, arteries and afferent arterioles, and 40× for peritubular capillaries. Silver stained whole slide images yielded the worst deep learning performance. Thus, this largest study to date adapted deep learning for the segmentation of kidney histologic structures across multiple stains and pathology laboratories.

The assessment of renal biopsy is unique compared to other surgical pathology specimens because of the variety of stains routinely used. Morphologic assessment of histological preparations relies on the quality of the preparations itself, and the expertise of the pathologist in identifying normal and pathological structures. The example study demonstrates that Deep Learning-based Convolutional Neural Networks (CNNs) may be employed for efficient and reliable segmentation of histologic structures across different stains of normal renal parenchyma using the NEPTUNE whole slide images. This dataset was curated from 38 histology laboratories and reflects substantial morphologic, technical, and stain heterogeneity. The example study represents a technical foundation from which future pathology tools may be built to enable actionable clinical decision support tools for better disease characterization and risk assessment in pathology workflows.

Overview

Renal biopsy interpretation remains the gold standard for the diagnosis and staging of native and transplant kidney diseases. While visual morphologic assessment of the renal parenchyma may provide useful information for disease categorization, manual assessment and visual quantification by pathologists are time consuming and limited by poor intra- and inter-reader reproducibility.

The introduction of digital pathology in nephrology clinical trials has provided an unprecedented opportunity to test machine learning approaches for large scale tissue quantification efforts. Standardization of pathology material acquisition has allowed world-wide consortia to establish digital pathology repositories (DPRs) containing thousands of digital renal biopsies for the evaluation of kidney diseases in adults and children, across diverse populations and pathology laboratories. This large-scale quantification, however, presents some new challenges. Unlike cancer pathology where hematoxylin and eosin (H&E) is generally the sole stain employed, renal biopsies require routine special stains such as Jones and periodic acid-methenamine silver (SIL), periodic acid Schiff (PAS), and Masson trichrome (TRI). Additionally, the multicenter nature of such consortia is reflected in the heterogeneity of preparations (e.g., integrity of tissue sections and quality of the stains).

Deep Learning (DL) is a machine learning approach that recognizes patterns in images through a network of connected artificial neurons. DL uses deep convolutional neural networks (CNNs) that are capable of identifying patterns in complex histopathology data prone to such heterogeneity. U-Net is a popular semantic-based DL network validated in the context of biomedical image segmentation, which takes spatial context of pixels into consideration as opposed to naïve pixel level DL classifiers. The output of U-Net is a high-resolution image (typically the same size as the input image) with labeled class predictions at the pixel level.

The example study evaluated the feasibility of DL approaches for automatic segmentation of 6 renal histologic primitives on 4 different stains, using the digital renal biopsies from a multi-center Nephrotic Syndrome Study Network (NEPTUNE) dataset. In addition, annotation and training considerations were described, specifically as they relate to DL algorithms for digital nephropathology. The example study was the largest comprehensive study to address applicability of DL approaches employable for kidney pathology images generated in a multi-center setting.

Results

DL Performance Per Histological Primitive

Figure 4:
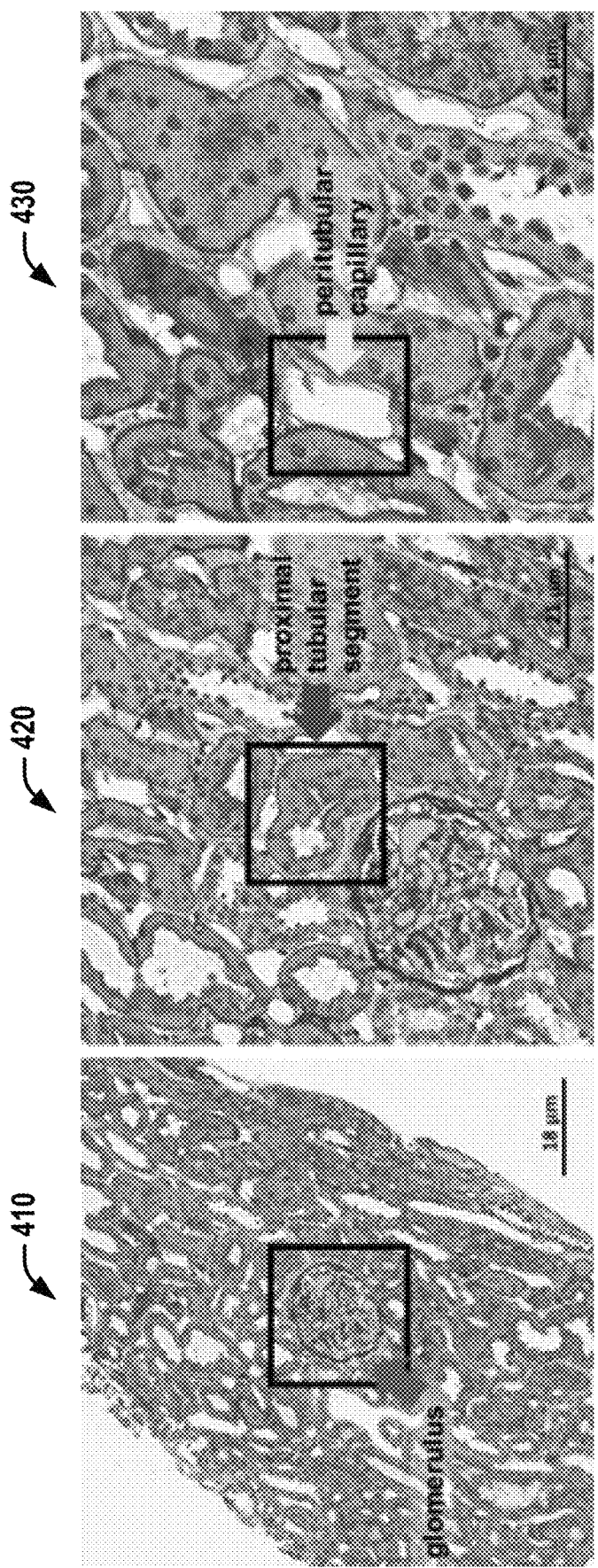
FIG. 4 illustrates example optimally digitally magnified regions of interest (ROIs) from the example study, in connection with various aspects discussed herein.
Figure 5:
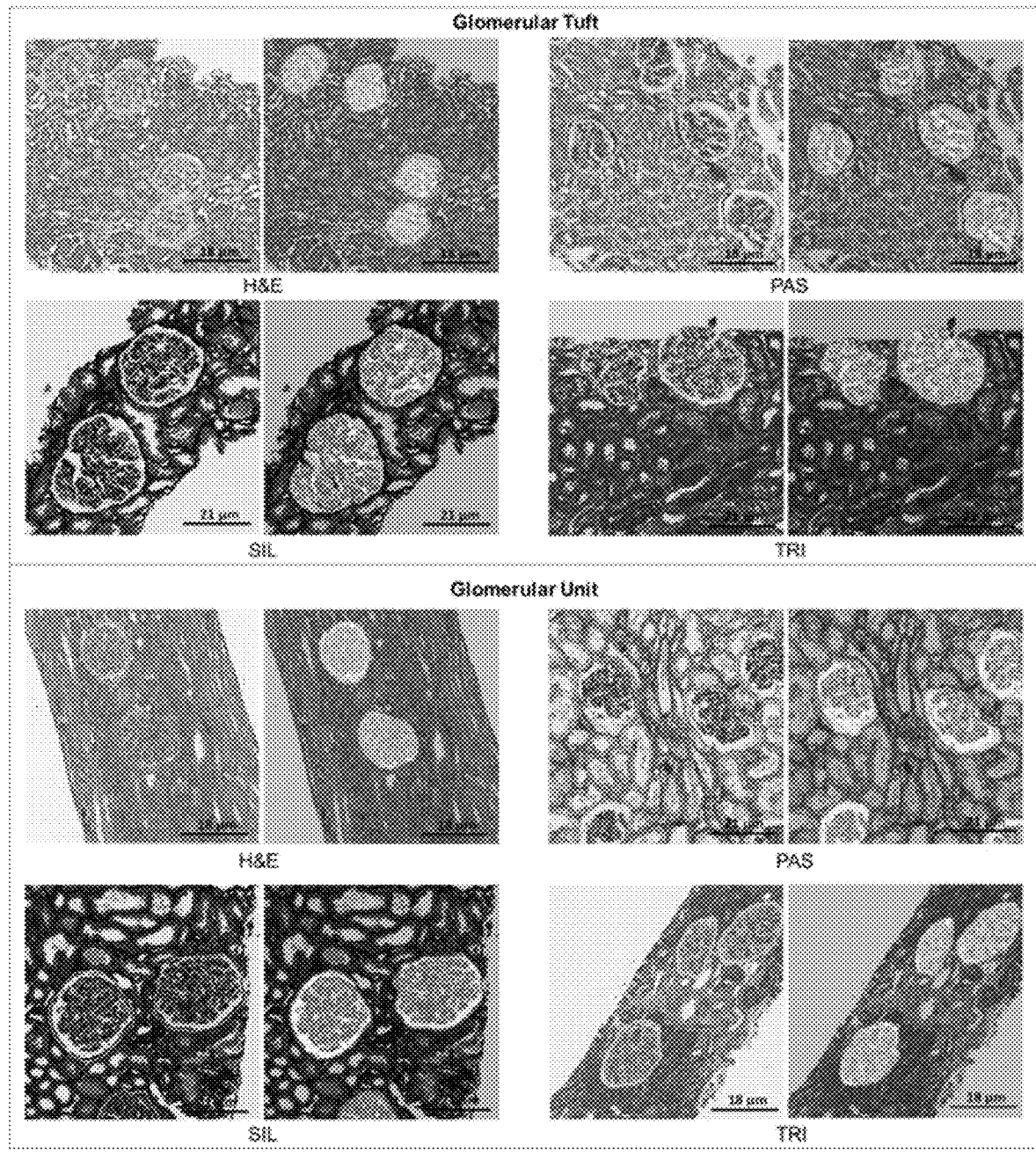
FIG. 5 illustrates example images showing Deep Learning (DL) segmentation of glomerular tuft and unit, in connection with various aspects discussed herein.

Glomerular Tuft: The classifier performed consistently across the 4 different stains with only marginal differences in F-score and DSC. A 5× digital magnification on PAS and H&E stains (e.g., as seen in FIGS. 3-5, discussed below) resulted in optimal detection and segmentation.

Glomerular Unit: Consistent quantitative performance metrics with F-score and DSC over 0.89 were observed across all stains, with optimal results for detection and segmentation using 5× digital magnification on PAS and SIL stains (e.g., as seen in FIGS. 3-5, discussed below).

Figure 6:
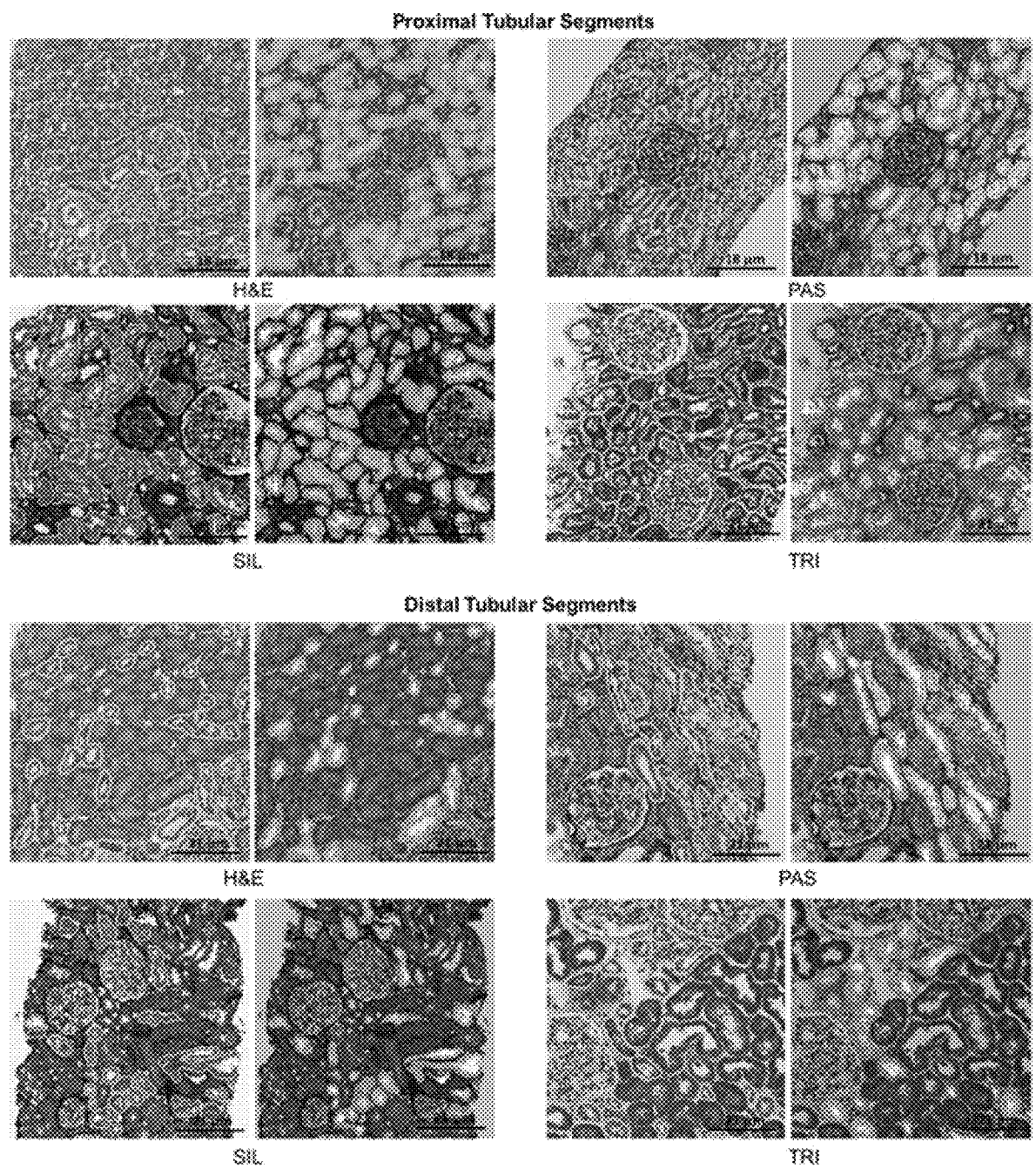
FIG. 6 illustrates example images showing Deep Learning (DL) segmentation of proximal and distal tubular segments, in connection with various aspects discussed herein.

Proximal Tubular Segments: Segmentation results varied little across the stains (F-score from 0.89 to 0.91, and DSC from 0.88 to 0.95), with PAS, SIL, and TRI stains having better performance than the H&E stain. A 10× magnification was optimal for detection and segmentation across all stains (e.g., as seen in FIGS. 3, 4, and 6, discussed below).

Distal Tubular Segments: Segmentation results were highly variable across all the stains: F-scores were 0.78 and 0.81 for H&E and TRI, respectively, and 0.91 and 0.93 for SIL and PAS, respectively. DSC scores were 0.78 and 0.82 for H&E and TRI, and 0.92 and 0.93 for SIL and PAS. Optimal results for detection and segmentation were obtained using 10× digital magnification on PAS and SIL stains (e.g., as seen in FIGS. 3, 4, and 6, discussed below).

Figure 7:
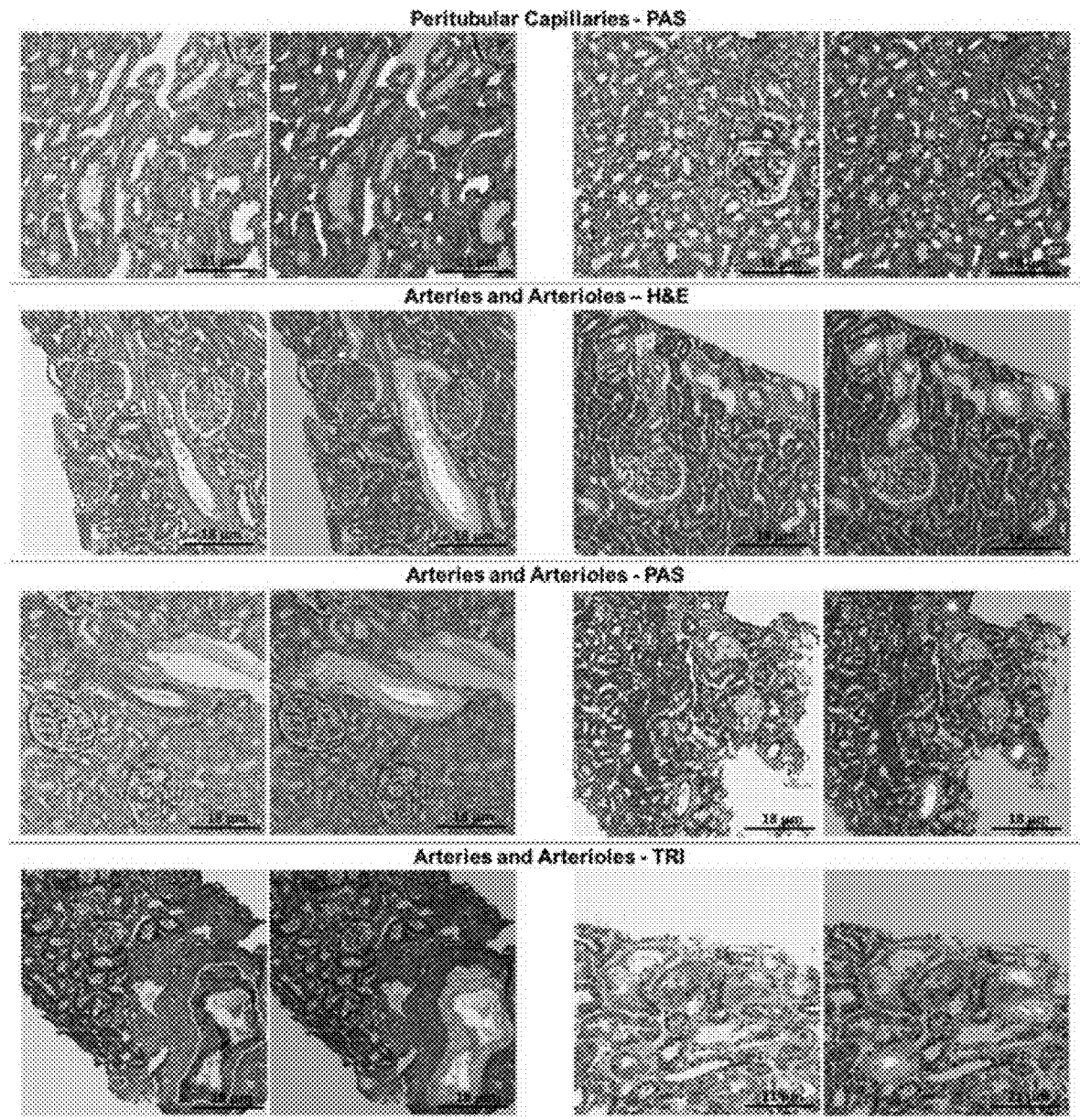
FIG. 7 illustrates example images showing Deep Learning (DL) segmentation of arteries/arterioles and peritubular capillaries, in connection with various aspects discussed herein.

Arteries/Arterioles: Arteries/Arterioles segmentation was variable across stains, with F-scores ranging from 0.79 to 0.85 across TRI, H&E, and PAS staining and DSC ranging from 0.85 to 0.90. Optimal results for detection and segmentation were obtained using 10× on PAS stain (e.g., as seen in FIGS. 3, 4, and 7, discussed below).

Peritubular Capillaries: Optimal results for detection and segmentation were obtained using 40× magnification on PAS stain (e.g., as seen in FIGS. 3, 4, and 7, discussed below). Qualitative segmentation results on the testing cohort showed that most of the large-sized peritubular capillaries were thin and long as they were cut tangentially from the biopsy. While the size, shape and textural presentation of peritubular capillaries varied (e.g., as seen at 810 in FIG. 8, discussed below), the U-Net model was able to detect and segment peritubular capillaries of varying sizes and shapes (e.g., as seen in FIG. 8, discussed below). The classifier tended to perform better on thin and long, small to medium sized capillaries. However, capillaries with size lesser than 40 pixels (167 $\mu m^2$) failed to be identified or were inaccurately segmented.

Referring to FIG. 3, illustrated is a table showing deep learning performance metrics of the example study for structurally normal histological primitives at optimal digital magnification, in connection with various aspects discussed herein. For each of the indicated histological primitives, FIG. 3 shows F-score, Dice Similarity Co-efficient (DSC), True Positive Rate (TPR), and Positive Predictive Rate (PPR) for each of the indicated stains.

Referring to FIG. 4, illustrated are example optimally digitally magnified regions of interest (ROIs) from the example study, in connection with various aspects discussed herein. The optimal magnification varied for each histologic primitive using patch size of 256×256 pixels (px): PAS glomerular unit and tuft were 5× (e.g., as shown at 410), proximal and distal tubular segment were 10× (e.g., as shown at 420), peritubular capillary was 40× (e.g., as shown at 430), and arteries/arterioles were 10×.

Referring to FIG. 5, illustrated are example images showing Deep Learning (DL) segmentation of glomerular tuft and unit, in connection with various aspects discussed herein. FIG. 5 shows DL segmentation for glomerular unit and tuft on whole slide images of formalin-fixed and paraffin-embedded sections from minimal change disease, stained with Hematoxylin & Eosin (H&E), Periodic Acid Schiff (PAS), trichrome (TRI) and silver (SIL). For each stain, the original image overlaid with ground truth is presented on the left and the DL segmentation is presented on the right. The positive classes are highlighted in bright pink from a green transparent mask overlaid on the original image. The DL output is specifically tracing the Bowman's capsule for glomerular unit and the profile of the capillary wall for the glomerular tuft. The glomerular units and tufts were correctly identified across all types of stains.

Referring to FIG. 6, illustrated are example images showing Deep Learning (DL) segmentation of proximal and distal tubular segments, in connection with various aspects discussed herein. FIG. 6 shows DL segmentation for tubular segments on whole slide images of formalin fixed and paraffin embedded sections from minimal change disease, stained with Hematoxylin & Eosin (H&E), Periodic Acid Schiff (PAS), trichrome (TRI) and silver (SIL). For each stain, the original image overlaid with ground truth is presented on the left and the DL segmentation is presented on the right. The positive classes are highlighted in bright pink from a green transparent mask overlaid on original image.

Referring to FIG. 7, illustrated are example images showing Deep Learning (DL) segmentation of arteries/arterioles and peritubular capillaries, in connection with various aspects discussed herein. FIG. 7 shows DL segmentation for arteries/arterioles on whole slide images of formalin fixed and paraffin embedded sections from minimal change disease, stained Hematoxylin & Eosin (H&E), Periodic Acid Schiff (PAS), trichrome (TRI) and silver (SIL), and for peritubular capillaries on WSI of formalin fixed and paraffin embedded sections stained with PAS, with the original image overlaid with ground truth on the left and the DL segmentation on the right. The positive classes are highlighted in bright pink from a green transparent mask overlaid on original image.

Referring to FIG. 8, illustrated is a chart showing Deep Learning (DL) Segmentation performance in relation to the morphologic heterogeneity of peritubular capillaries along with four example images, in connection with various aspects discussed herein. As shown at 810, most of the peritubular capillaries were small when measured in number of pixels. The size of the peritubular capillaries (PTCs) has an exponential distribution with a long tail from small to large. Each pixel is 0.06 $\mu m^2$ on tissue, and as observed, most of the PTCs are under 90 $\mu m^2$. Images 820 Examples of DL performance on small (830), medium (820) and large (840-850) sized peritubular capillaries.

Figure 9:
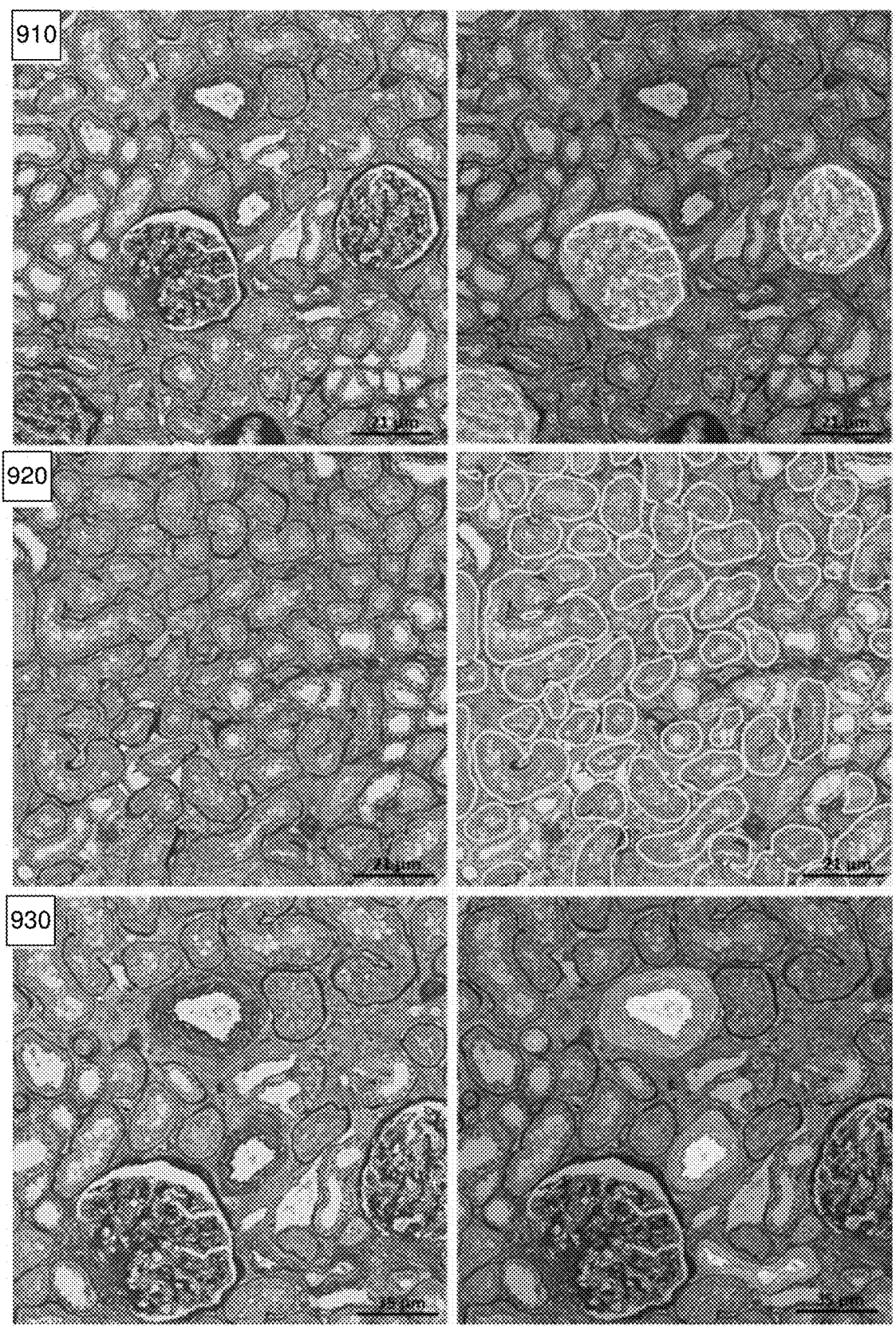
FIG. 9 illustrates example images showing Deep Learning (DL) segmentation of normal histologic primitives on PAS Nephrectomies, in connection with various aspects discussed herein.
Figure 10:
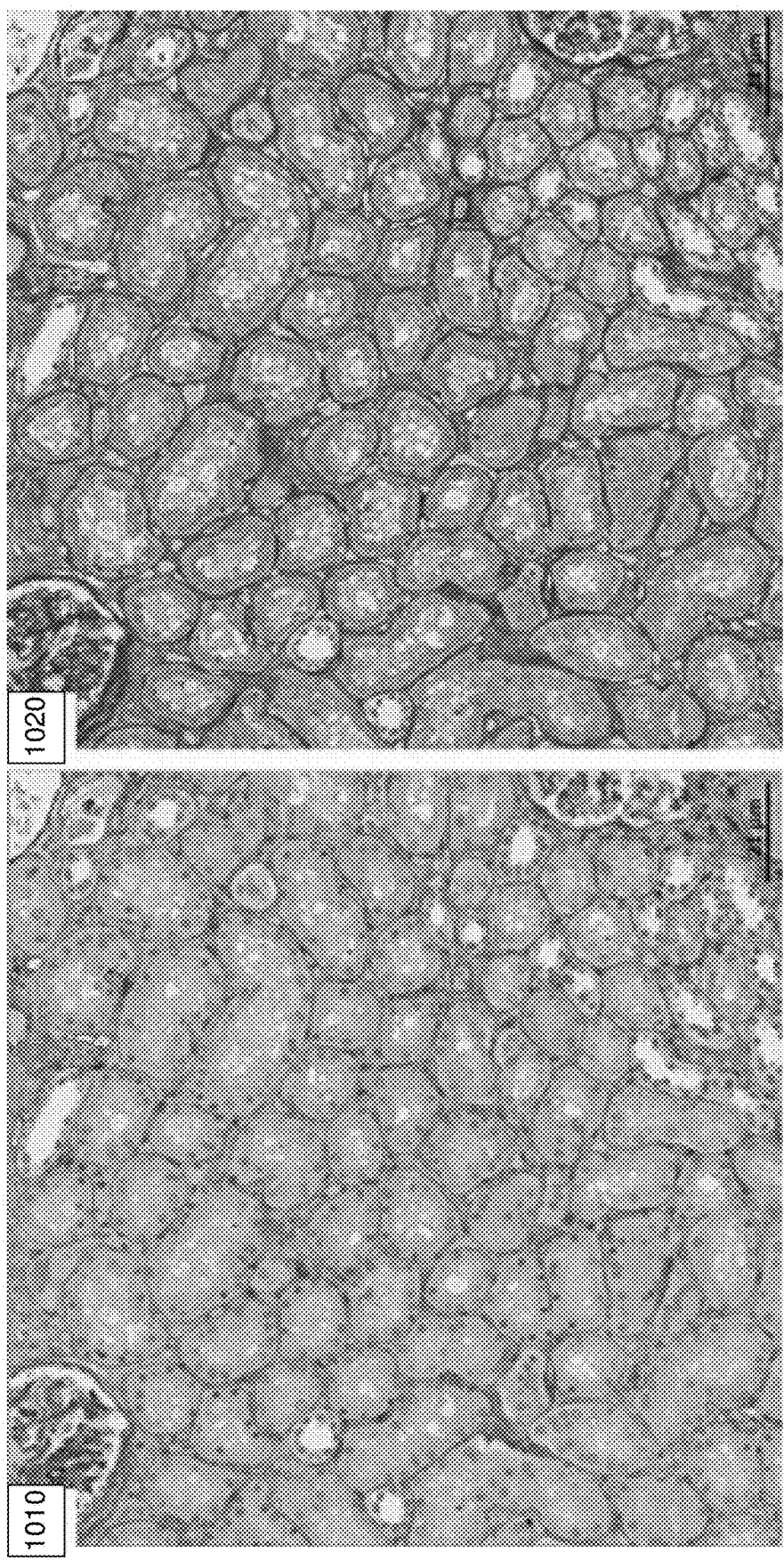
FIG. 10 illustrates example images showing segmentation outputs of peritubular capillaries (PTCs) on PAS nephrectomies, in connection with various aspects discussed herein.

Validation of DL models using Nephrectomies: An F-score of 0.93 was obtained for 191 glomerular units, 0.90 for 1484 proximal tubules, 0.93 for 1251 distal tubules, 0.71 for 269 arteries/arterioles (e.g., as seen in FIG. 9, discussed below), and 0.90 for 3784 peritubular capillaries (e.g., as seen in FIG. 10, discussed below). The rare globally sclerotic glomeruli and atrophic tubules present in the sections were not segmented by the DL network.

Referring to FIG. 9, illustrated are example images showing Deep Learning (DL) segmentation of normal histologic primitives on PAS Nephrectomies, in connection with various aspects discussed herein. Images 910 show segmentation of normal glomerular units, images 920 show segmentation of proximal (yellow) and distal (green) tubules (including rare atrophic tubules that were detected by the deep learning algorithms), and images 930 show segmentation of arteries/arterioles. For images 910-930, the left column shows the original images, and the right column shows segmented versions of those images.

Referring to FIG. 10, illustrated are example images showing segmentation outputs of peritubular capillaries (PTCs) on PAS nephrectomies, in connection with various aspects discussed herein. Image 910 shows an example formalin fixed and paraffin embedded section stained with Periodic Acid Schiff (PAS) and CD34 (double stain), and image 920 shows DL segmentation of peritubular capillaries on the same section stained with PAS alone. There is overlap between the CD34 positive stain and the DL detection of peritubular capillaries. Overall, the DL performance was similar to the segmentation accuracy on the testing set for minimal change disease.

DL Segmentation Performance Across Sites and Artifacts

It was observed that tissue samples prepared across various sites showed significant heterogeneity in tissue presentation, stain variation and presence of artifacts. Images in the testing set were evaluated for 3 types of artifacts: glass (dirt, bubble, pen marks), scan (blurriness, out of focus, griddling, brightness/contrast), and section (tissue folding, knife chatter, uneven staining, tissue thickness). It was observed that section artifacts had limited impact on DL performance. Referring to FIG. 11, illustrated is a table showing performance of peritubular capillaries (PTC), arteries/arterioles (A/A), glomerular tufts (GT), proximal tubules (PT) and distal tubules (DT) deep learning models using WSIs generated at different pathology laboratories, in connection with various aspects discussed herein. Glass artifacts, on the other hand, showed a slight negative impact on DL performance in both arteries/arterioles and proximal tubules. However, further exhaustive study is needed for better understanding of how artifacts impact DL performance. It is also worth noting the substantial differences in performance across the different sites. The deep learning performance of each primitive was assessed using PAS stained WSIs for each individual site, using cases obtained from 21 of the 29 centers in the testing cohort. Referring to FIG. 12, illustrated is a table showing the performance of Peritubular Capillaries (PTC), Arteries/Arterioles (A/A), Glomerular Tuft (GT), Proximal Tubules (PT) and Distal Tubules (DT) deep learning models in the presence of different types of artifacts caused by scanning issues, glass slide preparation and digitization and tissue section presentation, in connection with various aspects discussed herein. In FIG. 12, '-' indicates no such artifact was found in the testing image group of the targeting primitive. There was histologic primitive-dependent variability in performance across sites. While glomerular unit and tuft had the most consistent performance across sites, peritubular capillaries had the worse. Additionally, it was observed that the models tend to perform better in sites where tissue section thickness was perceived as acceptable versus those where pathologists identified the presence of cutting thickness artifacts. As such, these errors associated with tissue artifacts represent an important issue that needs to be addressed when applying DL to abnormal kidney structures.

DL Performance as a Function of Number of Training Exemplars:

The rate of improvement of the network performance as a function of the number of training exemplars was observed to be different across histologic primitives. The number of exemplars needed to maximize network performance increases substantially from glomerular tufts to distal tubular segments, arteries/arterioles, and finally to peritubular capillaries (e.g., as seen in FIG. 11, discussed below). For larger structures such as glomerular tufts, it was observed that only 60 training samples were necessary to achieve a F-score of 0.89, with a 0.02 increase using 183 tufts. For smaller and largely represented structures such as distal tubules, a 0.07 increase in F-score was observed by increasing the number of exemplars from 507 to 2789. For structures such as arteries/arterioles with varying sizes, the F-score increased by 0.13, increasing the number of exemplars from 258 to 864. A significant increase in F-score from 0.27 to 0.81 was observed with peritubular capillaries by increasing the number of exemplars 2.5 times (i.e. from 4273 to 10975).

Figure 13:
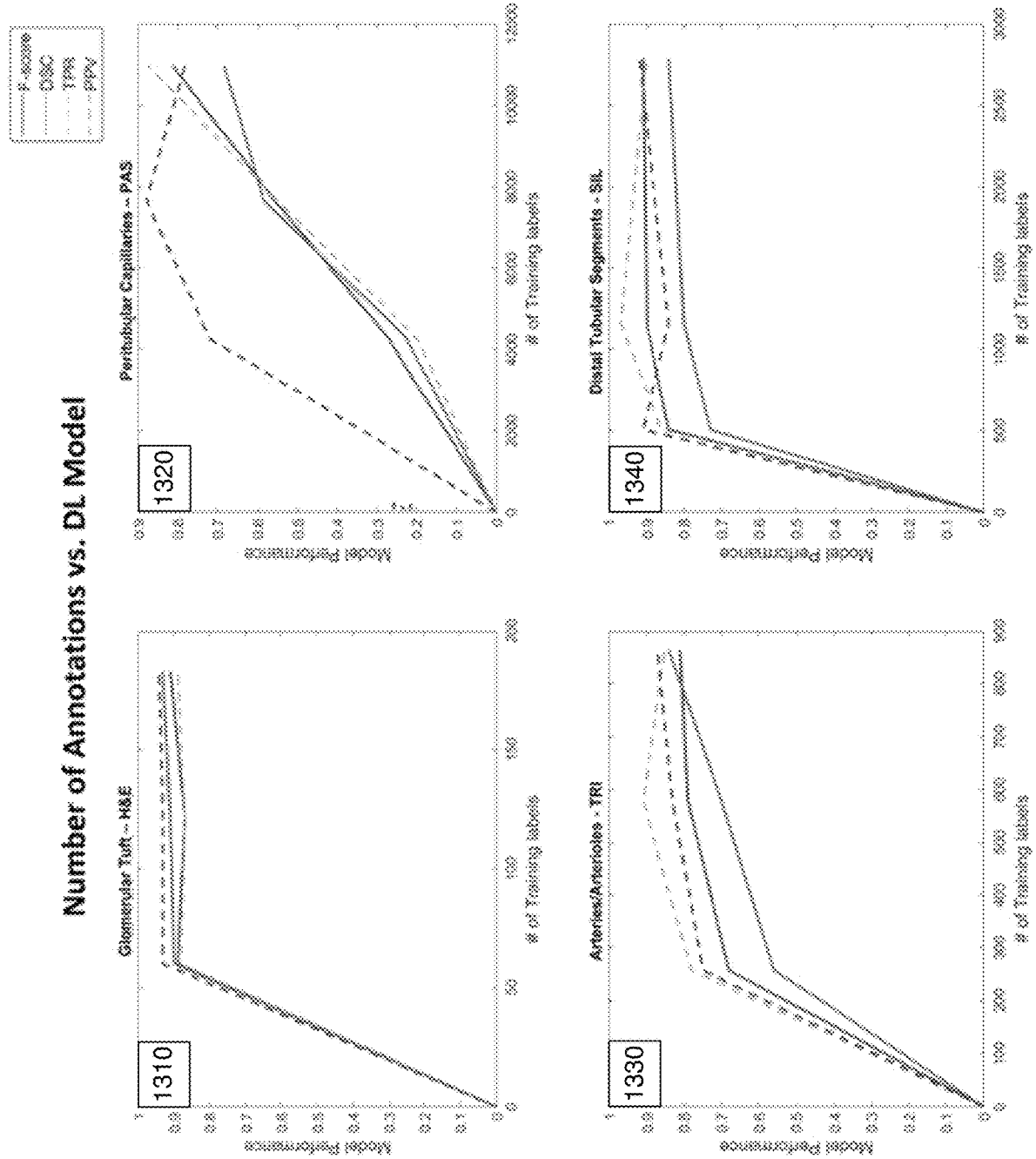
FIG. 13 illustrates graphs showing increase in model performance with increasing number of training annotations in the example study, in connection with various aspects discussed herein.

Referring to FIG. 13, illustrated are graphs showing increase in model performance with increasing number of training annotations in the example study, in connection with various aspects discussed herein. The model performance was measured as F-score, Dice Similarity Coefficient (DSC), True Positive Rate (TPR), Predictive Positive Value (PPV). For histologic primitives such as glomerular tufts (1310), a small number of annotations could be used to construct a robust classifier, in contrast to peritubular capillaries (1320), where a larger number of annotations were used to construct a robust classifier. The performance metrics for peritubular capillary segmentation increased linearly as more annotations were added. Arteries/arterioles (1330) and distal tubules (1340) had intermediate rates of convergence with increasing number of annotations.

Discussion

The assessment of renal biopsy is unique compared to other surgical pathology specimens because of the variety of stains routinely used. Morphologic assessment relies on the quality of the preparations itself, the pathologists' expertise in detecting the individual structures and associated changes, and quantitative or semi-quantitative metrics used to capture the extent of tissue damage. Visual histologic quantitative assessment such as counting, distribution, as well as morphometry of certain histologic primitives are known to be robust predictors of outcome for various kidney diseases. However, quantitative analysis remains a challenge for the human eye. Some of these primitives (e.g. peritubular capillaries) cannot be measured visually/manually and warrant the aid of computational algorithms. Recent studies have suggested that computer vision tools can help serve as triage and decision support tools for disease diagnosis with digital pathology. Thus, automated image analysis tools need to be implemented and integrated into the pathology workflow for efficient and reliable segmentation of histologic primitives across multiple types of stains. DL segmentation tools could greatly facilitate derivation of not only the visual, but also sub-visual histomorphometric features (e.g. shape, textural and graph features) for correlation with diagnosis and outcome.

The example study attempted to address the challenges of computational renal pathology for large scale tissue interrogation, by providing deep learning algorithms for thorough annotation of 6 histologic primitives on renal parenchyma of MCD, using WSIs of 4 different stains and generated across 29 NEPTUNE enrolling centers. In the last few years there have been a number of studies demonstrating the utility of DL networks for low-level image analyses (i.e., detection, segmentation, classification of histologic primitives), and high-level complex prognosis and prediction tasks. The example study is the largest comprehensive deep learning study of kidney biopsies and presented algorithms that were developed on different stains and used a large number of annotated images, compared to those previously published. The primary conclusions and significant findings from the example study are described below.

Comparison with current literature: There are multiple differences between previous studies and the example study, as discussed below. Previously published studies focus on a single histologic primitive and a single stain. As examples, a first group evaluated CNNs for detection of global glomerulosclerosis in transplant kidney frozen sections stained with H&E; a second group evaluated CNNs to discriminate normal, segmentally and globally sclerosed glomeruli from trichrome stained formalin-fixed and paraffin-embedded kidney sections; a third group applied DL to detect glomeruli on PAS stained sections; and a fourth group demonstrated segmentation of normal and pathologic histologic structures using PAS stained WSIs of nephrectomy cortex tissue. A fifth group demonstrated DL approach to improve glomerular detection on one staining using results from differently stained sections of same tissue. In the example study, the DL networks on all 4 stains represent a first step for future clinical deployment allowing for the detection, segmentation, and ultimately quantification of several normal histologic primitives in all stains routinely used for diagnostic purposes.

Another element to be taken into consideration prior to the large-scale use of DL networks is how they can be applied to heterogeneous datasets. The DL models of the example study were trained and tested on a very heterogeneous set of WSIs with pre-analytic variations in tissue acquisition, processing, and slide preparation using 4 different stains, thus facilitating the rigorous evaluation of the applicability of the DL approach in a multi-site setting.

Different DL approaches have been used for the segmentation of histologic primitives, such as one group that applied generative adversarial deep networks for stain-independent glomerular segmentation. Another group employed cycle-consistent generative adversarial networks (cycleGANs) in DL applications for multi-center stain transformation. A different group demonstrated U-Net based segmentation of 7 different tissue classes using 40 transplant biopsies on PAS stain. The approach in the example study was to develop multiple U-Net based DL networks using optimal digital magnification and varying number of annotations across primitives and stains.

All previous works have used relatively smaller number of WSIs of renal biopsies/nephrectomies as compared to the example study. Referring to FIG. 14, illustrated is a table of the deep learning dataset from the example study, in connection with various aspects discussed herein. FIG. 14 shows the number of training and testing ROI images extracted from 459 WSIs of 125 MCD patients and the number of manually segmented annotations for 6 structurally normal histologic primitives. The use of a large WSI dataset allowed for the ability to provide insights to pathologists for generating well-annotated training exemplars for each primitive and stain, as well as the number of training exemplars required for best network performance using U-Net CNNs (e.g., as shown in FIG. 13, discussed above).

The deployment of DL models into clinical practice depends on specificity of the segmentation of the individual histologic primitives and their pathologic variation. The DL networks generated in the example study are specific to structurally normal histologic primitives, as those seen in MCD or nephrectomies, and can be applied to both adult and pediatric renal biopsies. When the DL networks were tested on patches of renal parenchyma from nephrectomy specimens, the specificity for the structurally normal histologic primitives was maintained. The DL framework presented in the example study will also enable architecting of networks in the future that are specifically focused on automated segmentation and assessment of structurally abnormal histologic primitives and their correlation with clinical outcomes.

DL based Ranking of different Stains: The example study suggests that the PAS stain is best suited for identification of structurally normal histological primitives using the U-Net model. This may be because PAS appears to be consistently more homogeneous across pathology laboratories compared to TRI or SIL. PAS-stained WSIs highlight the basement membranes of different structures, which in turn provides superior definition of the boundary of each single primitive to be segmented. For this reason, PAS was the only stain used for segmentation of peritubular capillaries. Based on the results of the example study, PAS and H&E stains showed better performance for glomerular tuft and unit segmentation, PAS and TRI for arteries/arterioles, PAS and SIL for tubular segments and PAS for peritubular capillaries.

Optimal Digital Magnification for DL models: The results of the example study suggest that with a unified patch size of 256×256, optimal magnification for the DL models was 5× for glomeruli, 10× for tubules and vessels, and 40× for capillaries (e.g., as seen in FIG. 3). Interestingly, most of the optimal magnifications were concordant with the magnifications that pathologists tend to use when annotating the individual primitives, except for glomeruli where the pathologists used 15-20×. Larger structures such as glomeruli, tubules and vessels were more precisely segmented by the network at 5× to 10× magnification regardless of the stain. For smaller structures such as peritubular capillaries, larger digital magnification (40×) provided for accurate DL segmentation.

DL Segmentation Performance across Sites and Artifacts: Heterogeneity of tissue preparation and lack of standardization of the analytics is particularly relevant for multicenter studies, where the pathology material is collected from several laboratories. As expected, heterogeneity in tissue presentation and glass, tissue, and scanning artifacts were observed, each with variable contribution to the DL performance. For example, while in general tissue artifacts had limited impact on the DL networks, the thickness of the section appeared to affect performance. The impact of individual artifacts was also relative to the histologic primitive: for example, glass artifacts showed a slight negative impact on DL performance for arteries/arterioles and proximal tubules. Additionally, there was variability in DL performance across sites, and this variability appeared to be histologic primitive dependent (e.g., as discussed above in "DL Segmentation Performance Across Sites and Artifacts").

DL Performance as a function of number of Training Exemplars: The quantitative data of the example study validated the intuitive assumption that more exemplars are needed for those primitives that are more difficult to visually identify (e.g., tangentially cut arteries/arterioles or primitives at the edge of the ROI) (e.g., see FIG. 13). For those primitives that were too small or ill-defined (i.e. peritubular capillaries), curation and iterative annotation improved segmentation accuracy. For segmentation of glomerular tufts, the network converged to maximum accuracy with a small number (60-183) of training exemplars, and performance did not improve with inclusion of additional exemplars. For tubules and arteries/arterioles segmentation, the corresponding networks showed marginal to intermediate performance improvement with an increasing number of exemplars. In contrast, a significant increase in F-score and DSC (0.27 to 0.81) was observed with 2.5-fold increase in the number of peritubular capillary exemplars, a linear scope of F-score increase indicating even better accuracy with more exemplars.

Figure 15:
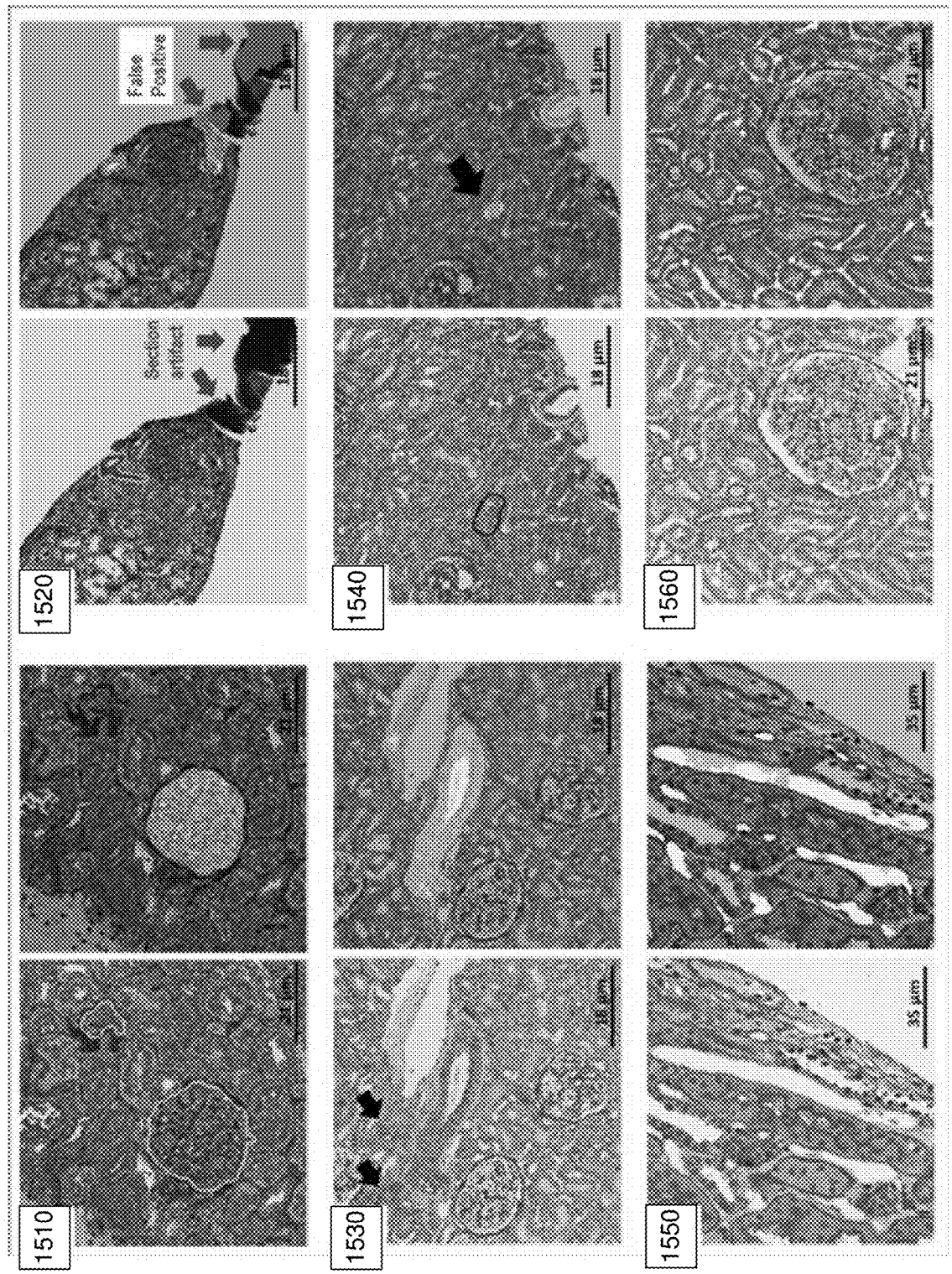
FIG. 15 illustrates images showing examples of false positives and false negative Deep Learning (DL) segmentations on Periodic Acid Schiff (PAS), in connection with various aspects discussed herein.

Interpreting Segmentation Results: Few false positives were observed in ROIs with artifacts (i.e. tissue folds, uneven staining), suggesting the need for digital quality assessment of the slide images prior to invocation of the computational models (e.g., as discussed above). In a few ROIs, the DL appeared to outperform the pathologists, for example, when a small portion of an artery/arteriole was at the edge of the ROIs and was not manually annotated as ground truth by the pathologist, as they were visually difficult to detect. This can be explained by the protocol used for segmentation of arteries, where pathologists included only arteries where the wall (tunica media and intima) and lumen were visible, and segmented the outer boundary of the tunica media. Thus, the models, trained to detect the tunica media and intima of the arteries, correctly identified small fragments of tunica media (arterial/arteriolar wall tangentially cut) as arteries/arterioles despite the lack of a lumen. Referring to FIG. 15, illustrated are images showing examples of false positives and false negative Deep Learning (DL) segmentations on Periodic Acid Schiff (PAS), in connection with various aspects discussed herein. Images 1510 show an example image of a glomerular unit wherein the DL failed to detect a tangentially cut glomerular unit that does not have a typical round shape. Images 1520 show an example image of an artery, wherein a section artifact generated a false positive (red thick arrows). Images 1530 show an example image of arteries, wherein the black arrows show two arterioles missed by the pathologist but detected by DL. Images 1540 show an example image of arteries, wherein pathologists were instructed to segment artery when lumen was present, but DL segmentation detected tangentially cut artery (black thick arrow) where only the media was visible. Images 1550 show an example image of peritubular capillaries, wherein a long shaped peritubular capillary revealed only partial DL segmentation at the pixel level. Images 1560 show an example image of peritubular capillaries, wherein the DL network for peritubular capillaries detected a few glomerular capillaries (false positives) (red thick arrow).

Additionally, tubules in renal biopsy sections are more often seen in transverse than longitudinal sections. The initial classifier missed some longitudinally sectioned tubules, mostly on H&E stained images, because the tubule boundaries were less sharp and longitudinally sectioned tubules were underrepresented in the initial training set. To facilitate and improve the process of annotation and the network, the false negative errors associated with the U-Net segmentation of the tubules were visually identified, manually refined by the pathologist, and the updated annotations were returned to the network. A few small arterioles were also incorrectly identified as distal tubules by the DL algorithm (false positives) during the first iteration. These false positive annotations were removed by the pathologist upon review of the initial classifier output and corrected images were returned to the network for retraining without changing the experimental set up or the network parameters, to eliminate false positives and negative errors of the DL algorithm.

In conclusion, the example study represents a solid foundation towards invoking machine learning classifiers to aid large scale tissue quantification efforts and the implementation of machine-human interactive protocols in clinical and pathology workflows. DL segmentation of histologic primitives enables computational derivation of histomorphometric features for enabling biopsy interpretation. Additionally, the framework presented in the example study will also pave the way for development of new DL networks in the future that are specifically geared towards (1) abnormal or pathologic histologic primitives (i.e., global and segmental sclerosis, glomerular proliferative features, collecting ducts, veins and peripheral nerves, tubular atrophy, interstitial fibrosis, and arteriosclerosis), (2) renal cortex and medullary compartments, and (3) across a wider spectrum of diseases. Further, various embodiments can be employed to one or more of provide disease prognosis or predict treatment response, or facilitate discovery of clinically actionable, non-destructive computational pathology-based imaging diagnostic biomarkers for kidney diseases.

Methods

Case and Image Dataset Selection

The example study was conducted using digital renal biopsies from the NEPTUNE DPR. NEPTUNE is a North American multi-center collaborative consortium with over 650 adult and children enrolled from 29 recruiting sites (38 pathology laboratories). Only cases with a diagnosis of Minimal Change Disease (MCD) were included in this study since histologically they are the most similar to normal renal parenchyma. A total of 459 curated WSIs (125 H&E, 125 PAS, 102 SIL, 107 TRI) from 125 MCD renal biopsies were used. Not all cases had all stains available in the DPR. Four WSIs were selected for each patient (1 WSI per stain). From each WSI, approximately 3 to 5 regions of interest (ROIs) containing the histologic primitives were randomly selected, inspected by a pathologist, and manually extracted as 3000× 3000 tiles, and stored as 8-bit red-green-blue (RGB) color images in PNG format at 40× digital magnification. Additional details on digitization and curation of biopsy WSIs are discussed below.

Independent validation of the DL models: 6 WSIs from 3 formalin-fixed and paraffin-embedded nephrectomy specimens were included to test the DL network performance for the segmentation of all histologic primitives on adult renal parenchyma without significant structural abnormalities. Sections from the nephrectomy specimens were stained with PAS, scanned into WSIs, and subsequently stained with a CD34 antibody, a marker of endothelial cells, and then re-scanned into WSIs. 175 random ROIs (3000×3000 pixels) were extracted from the PAS stained WSIs. The PAS-CD34 double stained WSIs were used as ground truth for validation of the DL segmentation approach for peritubular capillaries.

Histologic Primitives and Manual Segmentation

Figure 16:
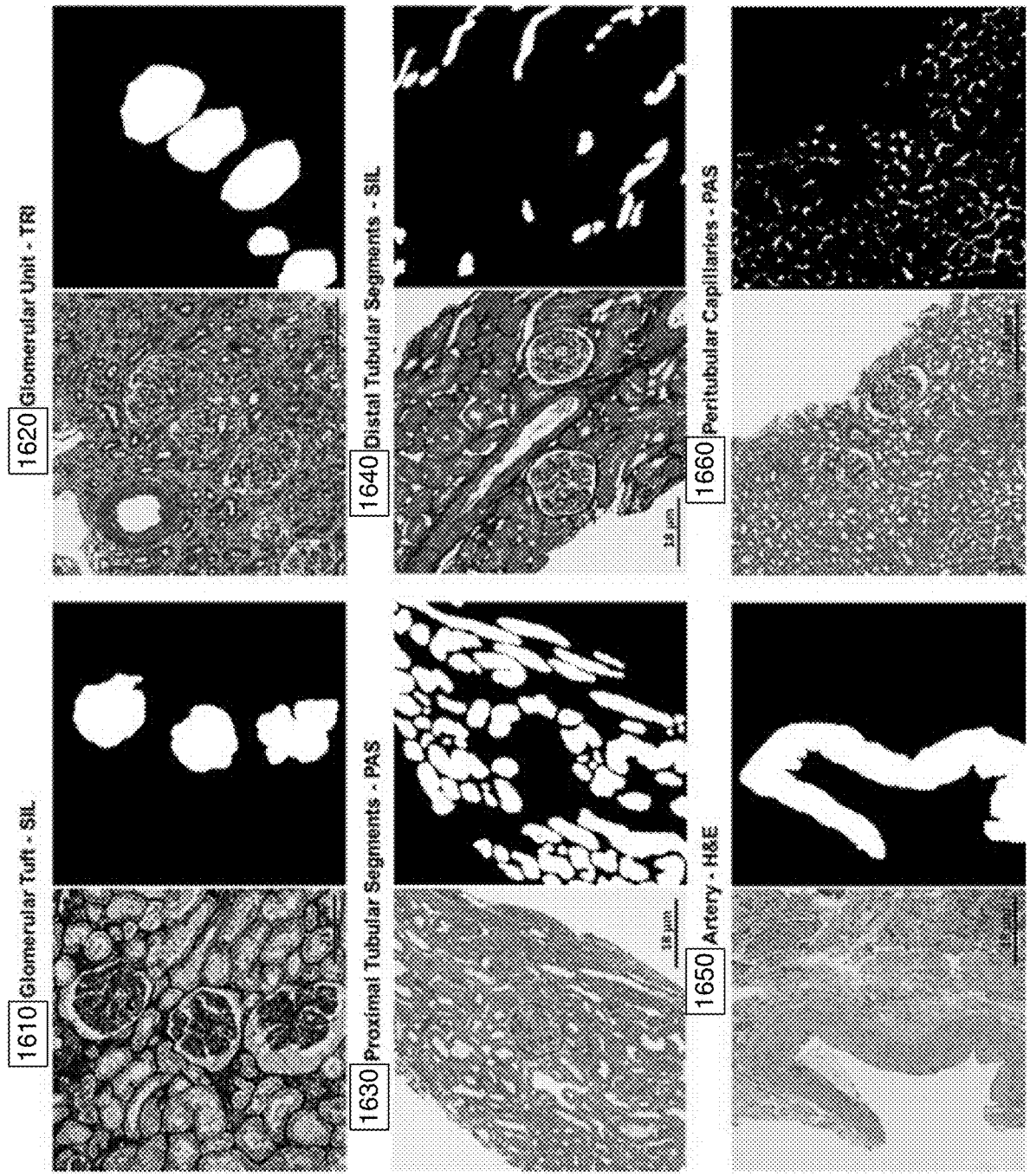
FIG. 16 illustrates example images showing ground truth annotation for histologic primitives of the example study, in connection with various aspects discussed herein.

Five renal pathologists manually segmented the ROIs to establish the ground truth for the histologic primitives (see FIG. 14). Manual segmentations were generated using an open-source software application. The ground truth annotations were saved as binary masks, i.e., each pixel that was denoted as part of a histologic primitive (positive class pixels expressed as binary 1s) or not (negative class pixels expressed as binary 0s). Through this process, 30048 annotations were made by pathologists on 1818 ROIs. Referring to FIG. 16, illustrated are example images showing ground truth annotation for histologic primitives of the example study, in connection with various aspects discussed herein. Examples of manual annotation on histologic primitives on whole slide images of formalin-fixed and paraffin embedded sections from minimal change disease, stained with Hematoxylin & Eosin (H&E), Periodic Acid Schiff (PAS), trichrome (TRI) and silver (SIL), and corresponding binary masks (black and white pictures) are shown for glomerular tufts (1610), glomerular unit (1620), proximal tubular segments (1630), distal tubular segments (1640), artery (1650), and peritubular capillaries (1660).

Six histologic primitives were used for the example study: glomerular tuft, glomerular unit (tuft+Bowman's capsule), proximal tubular segments, distal tubular segments, arteries and arterioles, and peritubular capillaries. Consistent and detailed ground truth labels across all training samples can greatly facilitate robust deep learning performance, especially in segmentation tasks. In order to produce consistent annotations across all images, each histologic primitive and its boundaries were carefully defined, and the annotation procedure for each use case standardized (e.g., as discussed in greater detail below). Furthermore, each annotation generated by a pathologist was reviewed by a second pathologist for quality assessment.

Deep Learning Experimental Pipeline and Training Methods

DL Dataset: Up to four WSIs per biopsy (H&E, PAS, TRI and SIL for each) were used for the segmentation of the glomerular tuft and unit, and proximal and distal tubular segments. Peritubular capillaries were segmented using only PAS WSIs, and arteries/arterioles were segmented only in H&E, PAS and TRI WSIs (see FIG. 14). WSIs were divided at the patient level into training, validation, and testing sets (ratio 6:1:3). The networks were developed using WSIs of both adult and pediatric patients (discussed in greater detail below). For training of the U-Net network, 5 pathologists annotated 1196 glomerular tufts and units, 4669 proximal and 2285 distal tubular segments, 19280 peritubular capillaries, and 2261 arteries/arterioles (see FIG. 14).

Figure 17:
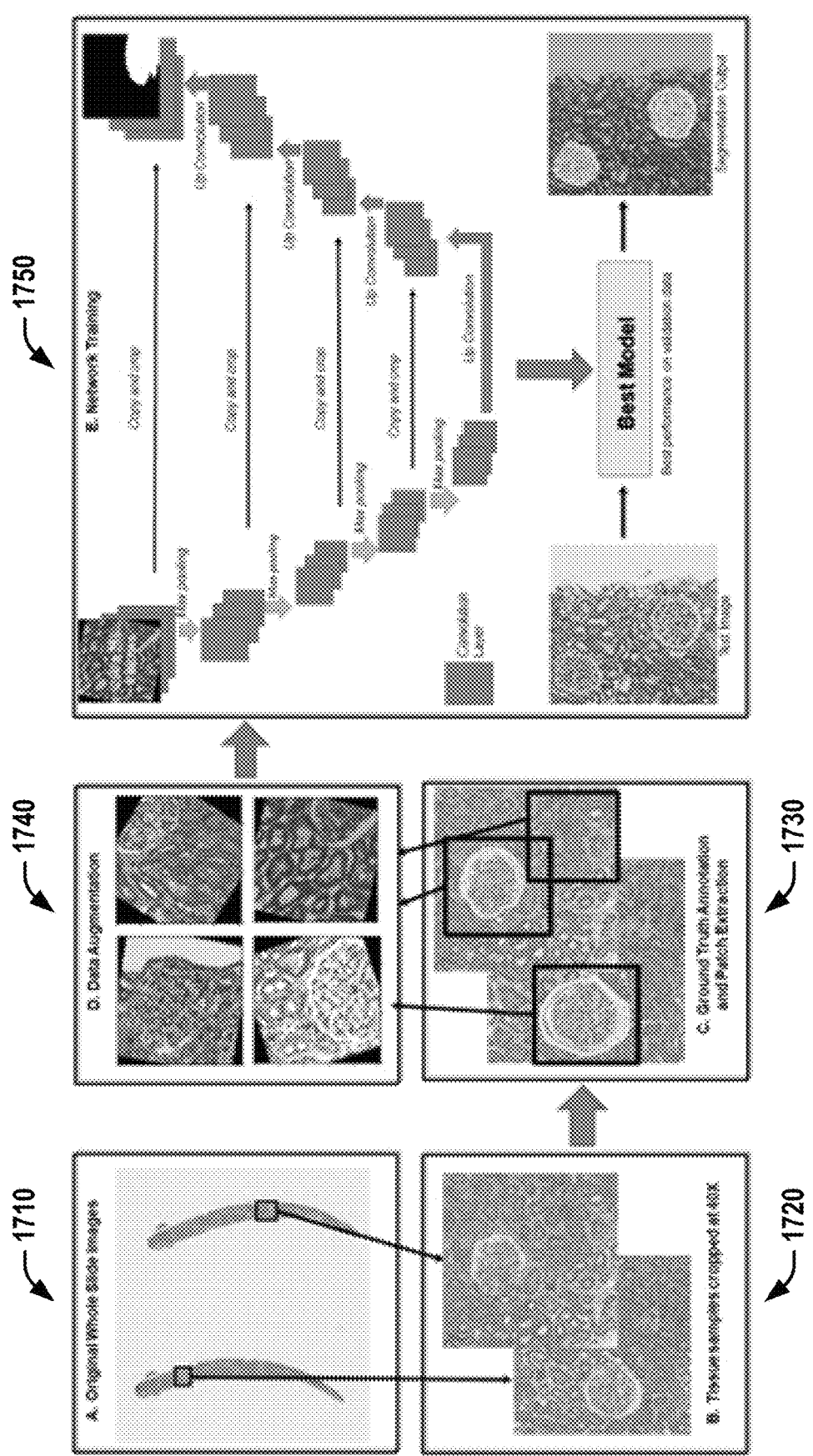
FIG. 17 illustrates example images showing a flowchart of the workflow of the Deep Learning (DL) experimental pipeline of the example study for each stain and use case, in connection with various aspects discussed herein.

Network Configuration and Training: A standard U-Net architecture with slightly tweaked parameters was implemented in PyTorch framework for training of each use case. Details of U-Net configuration, training methods including training set balancing and data augmentation are discussed in greater detail below. Referring to FIG. 17, illustrated are example images showing a flowchart of the workflow of the Deep Learning (DL) experimental pipeline of the example study for each stain and use case, in connection with various aspects discussed herein. Images 1710 show examples of whole slide images (WSIs) that were selected for generation of training, validation and testing data. Images 1720 show examples of regions of interests that were cropped from original WSIs with 40× digital magnification. Images 1730 show examples of ground truth labels that were generated by pathologists for training, and overlapping patches of size 256×256 px (0.24 μm/px) containing both image data and ground truth annotation information were cropped from the training and validation images (as shown in black boxes). Images 1740 show example images wherein for each path, a randomized data augmentation method was introduced to account for (1) size variation of primitives, (2) stain variations, and (3) tissue variations (e.g. thickness). As shown at 1750, all the training patches were passed to U-Net on PyTorch for training, and validation patches were used to generate loss and accuracy measures for each epoch trained to evaluate model performance. Finally, the epoch that yielded the lowest loss on the validation data was selected for generation of test results.

Detection and Segmentation Metrics: Detection and segmentation results were evaluated using F-Score, True Positive Rate (TPR), Positive Predictive Value (PPV) and Dice Similarity Coefficient (DSC). Values of 0 and 1 represent the maximal discordance and agreement, respectively, between the pathologist ground truth and the U-Net results. TPR, PPV and F-Score measure the detection accuracy of the DL networks. These metrics are computed using the number of correct segmentation results (true positives), incorrect segmentations (false positives), and missing segmentations (false negatives). DSC is the pixel-wise spatial overlap index that measures the segmentation accuracy of the classifier, values ranging from 0, indicating no spatial overlap between ground truth annotation and corresponding DL output mask, to 1, indicating complete overlap, and a DSC value>0.5 denoting a correct segmentation (true positive).

Number of training exemplars for different histologic primitives: To test how the number of manually annotated training exemplars influence the network performance we selected a representative set of histologic primitives based on size, complexity, distribution and stain namely, glomerular tufts on H&E, peritubular capillaries on PAS, distal tubular segments on TRI and arteries/arterioles on SIL. Specifically, the example study sought to evaluate the minimal number of annotated exemplars for standing up trained U-Net models for each type of histologic primitive. Towards this end, multiple U-Net models were trained for each type of primitive, each time with a greater number of annotated exemplars. Detection and segmentation accuracy were then computed for each such U-Net model for each primitive on the corresponding testing sets (see FIG. 13).

Additional Information

Digitization and Curation of Renal Biopsy WSIs

According to the NEPTUNE protocol, the glass slides from formalin-fixed and paraffin-embedded renal biopsies were scanned into WSIs using 2 scanners: Aperio Scanscope AT2 with an Olympus UPlan-SApo 20× objective, with a 0.75 numerical aperture (NA) and image doubler and Hamamatsu Nanozoomer 2.0 HT with similar objective and doubler, both resulting in 40× digital magnification image. The depth of field (DOF) was ~4 μm and pixel size was 0.24 μm/pixel. These WSIs were stored in the NEPTUNE DPR as SVS/NDPI formatted files.

WSIs were divided at the patient level into training, validation, and testing sets (ratio 6:1:3). The networks were developed using WSIs of both adult and pediatric patients. The median and interquartile range (IQR) age of patients in training set was 6.0 (12.0-21.0) for PAS, 6.0 (13.0-21.0) for TRI and 6.0 (15.0-26.0) for SIL, the validation set was 7.5 (24.0-51.5) for PAS, 11.0 (29.0-52.0) for TRI and 10.2 (26.5-51.2) for SIL, and testing set was 11.0 (16.0-39.0) for PAS, 10.2 (15.0-37.5) for TRI and 11.0 (16.0-38.5) for SIL.

An open source software, HistoQC, was used to facilitate quality control of WSIs by providing quantitative metrics. Slides identified as being compromised on account of presence of artifacts by HistoQC were then visually inspected by a computational engineer. This process resulted in the exclusion of 9 WSIs (1 H&E, 3 PAS, 4 SIL, 1 TRI). These slides were identified as having extreme artifacts, abnormally thick sections, or intense over-staining.

Histologic Primitives and Criteria for Segmentation

Glomerular Tuft (FIG. 16 at 1610) is defined as a network of capillaries and supporting structures suspended within the Bowman's space. Every glomerular tuft, including partial tufts on the edges within the ROIs, were manually annotated using the outer profile to the tuft along the capillary wall. The base of the mesangium, including the hilum of the glomerular tuft was included in the segmentation. All ROIs were fully annotated by pathologists for initial training of the DL classifier. The DL-generated binary masks were then manually corrected by pathologists for missing, incorrectly and partially segmented glomerular tufts for retraining the DL classifier.

Glomerular Unit (FIG. 16 at 1620) consists of the glomerular tuft along with the Bowman's space and capsule. Every glomerular unit within the ROIs was manually annotated using the profile of the Bowman's capsule. The base of the mesangium, including the hilum of the glomerular tuft was included in the segmentation. The portion of the arteriolar stem within an imaginary line connecting the two sides of the Bowman's capsule across the hilum was included in the segmentation, but the juxtaglomerular apparatus was excluded. Similar to the glomerular tufts, the ROIs were fully annotated by pathologists for initial training of the DL classifier. The DL-generated binary masks were then manually corrected by pathologists for missing, incorrectly and partially segmented glomerular units.

Proximal Tubular Segments (FIG. 16 at 1630) are defined by the presence of tubular brush borders and ample cytoplasm with the nuclei centrally positioned. The profile of the tubular basement membrane was used for annotation, and was more prominently highlighted in PAS, TRI, and SIL stains. Tubules occupy 90% of the renal cortical area. Due to the need to manually annotate a large number of tubules, ROIs (30% of 459 WSIs) for a subset of 35 patients were fully annotated by pathologists for initial training of the DL network. Subsequently, the network was employed to generate segmentations for the remaining 70% of cases. These DL-generated binary masks were then manually corrected by pathologists for missing, incorrectly, and partially segmented tubules.

Distal tubular Segments (FIG. 16 at 1640) have cells that are smaller than proximal tubular cells and have less cytoplasm, lack an apical brush border, and their nucleus often bulges into the tubular lumen. The profile of the tubular basement membrane was used for annotation, more prominently highlighted in PAS, TRI, and SIL stains. Similar to proximal tubules, a subset of 35 patient ROIs (30%) were manually annotated by pathologists, and then annotations for the remaining 70% were DL-generated and manually corrected.

Arteries/Arterioles (FIG. 16 at 1650) including arcuate (rare) and interlobular arteries, and arterioles were annotated when the lumen was visible, and using the outer margin of tunica media, while the adventitia was not included because of their inconsistent appearances. Arteries/arterioles were segmented only using H&E, PAS and TRI stained images. Similar to other primitives, a two-step training process for employed. The DLgenerated masks were manually corrected by pathologists for missed, incorrectly and partially segmented arteries/arterioles.

Peritubular Capillaries (FIG. 16 at 1660) are located between the tubular basement membranes and are variable in size and shape. Peritubular capillaries were identified when a lumen lined by endothelium and lacking of a tunica media was visualized. Vascular spaces lined by endothelium and lacking of a media that had a diameter greater than the diameter of any adjacent tubule were not included in the manual segmentation, Peritubular capillaries were segmented using the capillary basement membranes, whether they had a visible endothelial cell nucleus or not. PAS WSIs only were used for peritubular capillary segmentation because: a) PAS stain appears to be the most consistent stain across all laboratories compared to TRI and SIL, and b) the challenge in visualizing peritubular capillaries boundaries in H&E. Manual annotation of capillaries requires higher digital magnification for accuracy of segmentation and is time consuming. A subset of 64 patient ROIs (50% of 459 WSIs) were fully annotated by pathologists for initial training of the network, which was then employed to generate segmentations for the remaining 50% of cases. The DL segmentations were manually corrected by pathologists for all missing, incorrectly, and partially segmented peritubular capillaries.

The histologic primitives were manually segmented using the renal cortex only. The renal medulla was not used in the example study.

Network Training, Data Augmentation, Balanced Sampling and Pre/Post Processing

The following U-Net configuration was used for all use cases (e.g., for each combination of histological primitive and stain) in the example study: a) depth of the network: 5 blocks, b) number of unique kernels learned per block: 4, c) patch size: 256×256, d) number of training batches for each epoch: 3 and f) number of training epochs: 50 (however, in various embodiments, one or more of these can vary). This U-Net architecture resulted in approximately 2 million parameters in the network (see FIG. 17).

The same DL training pipeline was used for all use cases. Under a specific magnification, overlapping training and validation patches were extracted from each ROI in the training and validation cohorts. The degree of overlap is controlled by stride size. Oversampling could be done using a smaller stride size as appropriate. Patches were stored using PyTables in HDFS format to facilitate fast data access. Adam was used as the learning rate optimization algorithm for training, and cross entropy was chosen as the loss function for all primitives except PTCs, where weighted cross entropy was used. For each epoch, the network compared the DL model's output mask with the ground truth for both training and validation patches. Each pixel contributed to the calculation of loss function and the error derivative per learnable parameter. For each epoch, the network compared the DL model's output mask with the ground truth for both training and validation patches. Each pixel contributed to the calculation of loss function and the error derivative per learnable parameter. The epoch which yielded the lowest loss on the validation dataset was selected for generation of segmentation results on the testing dataset (see FIG. 17).

Figure 18:
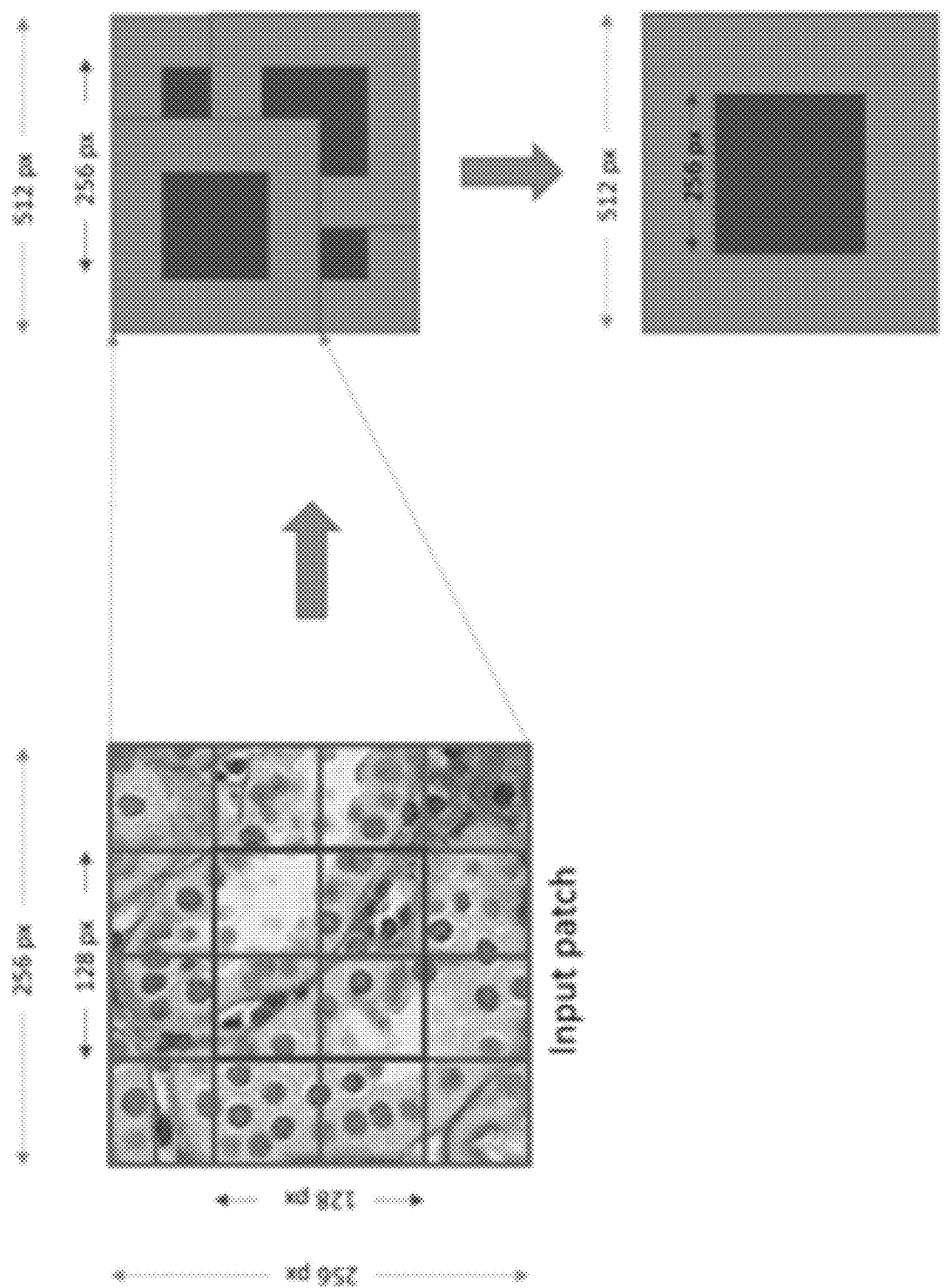
FIG. 18 illustrates example images showing the overlap-tile strategy for generation of output segmentation maps using an input patch size of 256×256 pixels (px) and stride of 128 px, in connection with various aspects discussed herein.

As discussed in the original U-Net paper, output towards the edges are often of lower performance due to the limited contextual information present. As suggested by the authors, to provide sufficient context for edge pixels, the original U-Net takes an input patch of 572×572 (blue box) and produces an output patch of 388×388 (yellow box) as illustrated in FIG. 2 in the paper. A sliding window technique was employed, which enables the center cropping and merging of output patches such that boundary pixels are excluded, as shown in FIG. 3 in the paper. The approach employed in the example study closely resembles this stitching approach, however, in the example study, small amounts of padding were employed such that the original input patch size of 256×256 was spatially retained during output creation. Referring to FIG. 18, illustrated are example images showing the overlap-tile strategy for generation of output segmentation maps using an input patch size of 256×256 pixels (px) and stride of 128 px, in connection with various aspects discussed herein. During output generation time, a sliding window of size 256×256 was slid across the image with a stride of 128 (in various embodiments, the size of the sliding window and stride can vary). For each patch, and to account for the edge affects noted in the original U-Net paper, only the inner 128×128 region of each segmentation (the red box of input patch in FIG. 18) was retained and stitched together to produce the final output result. This achieved the same purpose as the original U-Net paper, by avoiding artifactual edge regions which may not have sufficient context for confident evaluation.

By taking the approach of the example study, the amount of storage space required for the training data was significantly reduced from an estimated 556×556×3=927408 bytes down to 256×256×3=196608 bytes. Notably, the patch size is scaled to 556 instead of 572 (as stated in the original U-Net paper), since their output of 388×388 was scaled to the target size of 256×256 in the example study. When considering the 413 k patches employed in the capillary segmentation PAS stain use case, a reduction of 383 GB down to 77 GB (i.e., a 291 GB or 79% reduction) in storage is accomplished for a single model. Notably, this approach comes at a 2× computation cost during output generation, due to the stride being half of the patch size. This time penalty is in fact an upper-bound, as depending on memory constraints of the GPU, batches can be made larger so that the penalty is reduced solely to the transfer time of the additional patches to the GPU. Hence, from a computational perspective, the approach of the example study allows for easier output generation, while still accommodating for edge effects by computing, cropping, and stitching together overlapping patches.

With a fixed patch size of 256×256, a range of magnifications were applied for each primitive in order to find the optimal magnification at which to perform DL in each use case (see FIG. 14). For glomerular tufts, 4 U-Nets were trained at 4×, 5×, 8×, 10×, and 20× digital magnification. For glomerular units, 3 U-Nets were trained at 4×, 5× and 8×. For proximal and distal tubular segments, 3 U-Nets were trained at 5×, 10× and 20×. For peritubular capillaries 3 U-Nets were trained at 10×, 20× and 40×. For arteries/arterioles, 6 U-Nets were trained at 5×, 10×, 16×, 20×, 32× and 40×. In general, an attempt was made to use the magnifications that can fit an average primitive exactly into a single pixel patch, which tends to be concordant with the magnification used by pathologists when performing manual segmentation. Some low magnifications were also added in for testing purposes in every use case. The classifier with the optimal magnification yielding the best segmentation results was selected as the best model (see FIG. 4).

Several augmentation techniques were applied to the network to achieve the desired spatial invariance as well as robustness to deformations, and stain-variations. Affine augmentations (randomized rotation, flip, scaling, and random resized crop) were performed followed by randomized color augmentations (brightness, contrast, hue and saturation) to account for variations in size of primitives, stain, and tissue characteristics (e.g., thickness). Moreover, to address more significant variations in shapes, sizes and textures of PTCs compared with other histologic primitives, elastic transformation and grid distortion were added to the augmentation on top of previously listed transformations.

Primitives like glomerular tufts and units that present consistently in size, texture and shape across all cases and stains tend to be the easiest to train, while primitives that vary in these features required careful curation in data augmentation parameters to account for those deviations. Specifically, affine augmentation parameters were fine-tuned to train the model to be robust to differences in size. For example, for tubules, peritubular capillaries, and arteries/arterioles, a more intense resized cropping was used during data augmentation. Random combinations of brightness, contrast, hue, saturation and grayscale augmentation were applied after the affine transformations for stain variation. Although H&E and PAS stains have relatively smaller variations and artifacts as compared with TRI and SIL, equally strong color augmentation parameters were applied for robust performance to account for extreme outliers.

The target pixels for segmentation were defined as the positive class. For smaller sized primitives and primitives that do not appear as often (e.g., PTCs and Arterioles), the patch database would contain many more negative pixels than positive pixels without patch sampling. So, for these use cases, prior to training, patches with positive pixels were oversampled for class balancing. Patches with no positive class pixels were eliminated from the training set. For the PTCs, the positive to negative class pixel ratio can be still rather imbalanced after sampling. As such, class weights were introduced when calculating cross-entropy loss, where a slightly higher weight was assigned to the positive class over the negative class (0.55:0.45), as determined based on results from the training set.

Peritubular capillaries and arteries/arterioles have inconsistent morphologies (small/large endothelial-lined lumen, absence/presence of endothelial cell nuclei overlying the capillary basement membrane, vessel wall thickness variation, varying luminal contents and texture). To account for these variations, the peritubular capillary annotations were refined to include the endothelial luminal space only. As for arteries/arterioles, a preprocessing step was applied to the training mask, where the endothelial luminal space was excluded from the positive class. As such, the network picks up solely artery/arteriole wall textural features.

Due to the pixel level segmentation nature of U-Net, it was observed that touching instances of two individual histologic primitives could be segmented as one single connected structure. For accurate counting, the DL segmentation outputs were postprocessed using simple morphological operations (such as erosion) to separate the connecting instances. Previous works in connection with the example study also demonstrate novel boundary and region-based active contouring models using multiple level sets to resolve object overlap and separate occluded boundaries of individual instances of cellular histologic structures. Other studies have shown to employ detection networks such as Deep contour-aware networks for instance segmentation. While these approaches have not yet been applied to separating touching glomeruli, in various embodiments, these approaches could be applied to separating touching glomeruli and other kidney primitives. If anything, the fact that the glomeruli are egg-shaped and not overlapping as cells often are, should make it slightly easier to resolve the overlap, compared to intersecting and overlapping nuclei.

Glossary for Explanation of Technical Terms

Annotation, as used herein, includes ground truth labels generated by domain experts (pathologists) contouring individual target primitives.

Binary Mask, as used herein, includes a "mask" file generated from ground truth labels. The mask is the same size as the original tissue image, where the targeting pixels within the histologic primitives of interests are of value 1, and the other pixels 0.

Convolutional Neural Network (CNN) is one of the most popular DL network architectures. Through an iterative examination of a labeled data set, CNNs can learn increasingly higher levels of data abstractions from the original data.

Deep Learning (DL), as used herein, includes a machine learning approach that recognizes patterns in images through a network of connected artificial neurons.

Dice Similarity Coefficient, as used herein, includes a statistic used to gauge the similarity of two binary masks. It is essentially F-score, but in this case, calculated at the pixel level between the ground truth and DL predicted class labels.

Digital Pathology Repository, as used herein, includes a repository (data storage) of all digitized pathology images with associated clinical data.

DL Detection, as used herein, includes the ability of the machine learning algorithm to accurately identify the presence of an individual primitive. Detection performance can be measured by calculating F-score measure, a metric that considers both precision and recall attributes of the algorithm.

DL Segmentation, as used herein, includes supervised deep learning algorithms that used annotated training examples for segmentation of different histologic primitives. Segmentation performance is typically defined in terms of area overlap measures.

DL training database, as used herein, includes a collection of all patches extracted from training images and corresponding mask images, employed for training the DL algorithms.

Epoch, as used herein, includes 'a time period', a single iteration through all of the samples of the training data. Training time is determined by the number of epochs needed for network convergence.

F-score: In statistical analysis of binary classification, the F1 score (also Fscore or F-measure) is a measure of a test's accuracy. It considers both the precision p and the recall r of the test to compute the score: p is the number of correct positive results divided by the number of all positive results returned by the classifier, and r is the number of correct positive results divided by the number of all relevant samples (all samples that should have been identified as positive). The F1 score is the harmonic mean of the precision and recall, where an F1 score reaches its best value at 1 (perfect precision and recall) and worst at 0.

Ground Truth, as used herein, includes a definitive location or boundaries of interest as identified by an expert, and can be used in both the training and validation of detection/segmentation algorithms.

Histologic Primitive, as used herein, includes an anatomical/histological structural unit (e.g., glomerular tuft, glomerular unit, proximal and distal tubules, vessels, peritubular capillaries) or a cell type (e.g., podocytes, tubular cells, lymphocytes).

Machine Learning (ML), as used herein, includes an approach of using algorithms and statistical models based on patterns and inferences that computer systems leverage to perform a task without using explicit and specific step-by-step input instructions.

Manual Segmentation/Annotation, as used herein, includes manual delineation of histologic primitives by digitally tracing predefined boundaries of the histologic primitive or marking the histologic primitives with a pin, an arrow, or a number. Different software applications can be used for defining these boundaries and extracting them as a mask image. Although manual annotation is a more general term, it also refers to identification without tracing the boundaries.

PyTorch framework: A deep learning framework is an interface, library or a tool which allows users to build deep learning models quickly, without having to implement the mathematical models or underlying algorithms from scratch. PyTorch is among one of the most popular deep learning frameworks.

Segmentation, as used herein, includes demarcation of the boundaries/borders of a tissue structure (e.g., glomerular tuft, the glomerular unit, tubules) or cells (e.g., podocytes, tubular cells, lymphocytes).

Semantic Segmentation, as used herein, includes the concept of recognizing, and delineating image content at a pixel level.

Whole Slide Image(s), as used herein, includes scanned glass slide(s) of tissue sample(s) into a digital format.

Contributions Compared to Related Deep Learning Work in Renal Pathology

Number of DL experiments: The example study is the first comprehensive study in terms of number of experiments undertaken to date (A total of 132 experiments were conducted to discover best augmentation methods, magnifications for each histologic primitive using 4 stains). Previously reported studies involved fewer experiments. Additionally, previously reported studies showed results for a single model, even in the case of multi-class segmentation. Consequently, the network performance could not be performed for each individual feature.

Stains Used: The example study used H&E, PAS, TRI and SIL, while most previous studies used a single stain.

Number of tissue acquisition and processing centers and histology laboratories: For the example study, the glass slides were centrally scanned into WSIs that were generated across 38 pathology laboratories (29 enrolling centers); however, the number of labs (>=38) that prepared the samples is unknown. The differences in tissue processing shows variabilities in slide quality across sites. Previous studies used data from a much smaller number of sites (e.g., 1-3 sites, 3 laboratories, or 1 database associated with an unknown number of laboratories).

Number of patients and WSIs used: The example study used 459 WSIs from 125 patients. Previous studies varied, with the most known WSIs in a prior study being 275.

Number of ground truth manual annotations (segmentations) generated: The example study used a total of 30,048 manual annotations (segmentation) generated across 1818 ROIs, including 1196 glomerular tufts and units, 4669 proximal and 2285 distal tubular segments, 19,280 peritubular capillaries, and 2261 arteries/arterioles. Previous studies generally used fewer or substantially fewer, although two studies used more glomeruli.

Clear definitions for the histologic primitives and their boundaries: The example study used a clear protocol and guideline were established for the segmentation and annotation of each individual primitive. No standardized definitions of the histologic primitives and their boundaries for segmentation were provided in any previous publication.

Histologic primitives for study: The example study included the glomerular unit, glomerular tuft, proximal tubules, distal tubules, arteries/arterioles, and peritubular capillaries. No previous study included all of these histological primitives, and most only included glomeruli.

Models optimized for each histologic primitive: The example study used optimization of the training pipeline to address the morphological heterogeneity across primitives (e.g., magnification, data augmentation strategies, etc.), and provides best practices and pitfalls for future works in similar context (e.g., segmentation of pathologic histologic primitives). No previous works optimized the approach for multiple use cases.

DL network performance with increasing number of training exemplars: The example study was the first detailed and rigorous study of model convergence for each histologic primitive in terms of number of exemplars employed. No previous experimental evaluations have been reported thus far.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing deep learning model(s) to automatically segment selected type(s) of histological primitives on histological image(s) stained with selected stain type(s), based at least in part on features of histological images that are not perceivable by the human eye, and involve computation that cannot be practically performed in the human mind. As one example, deep learning models as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 19:
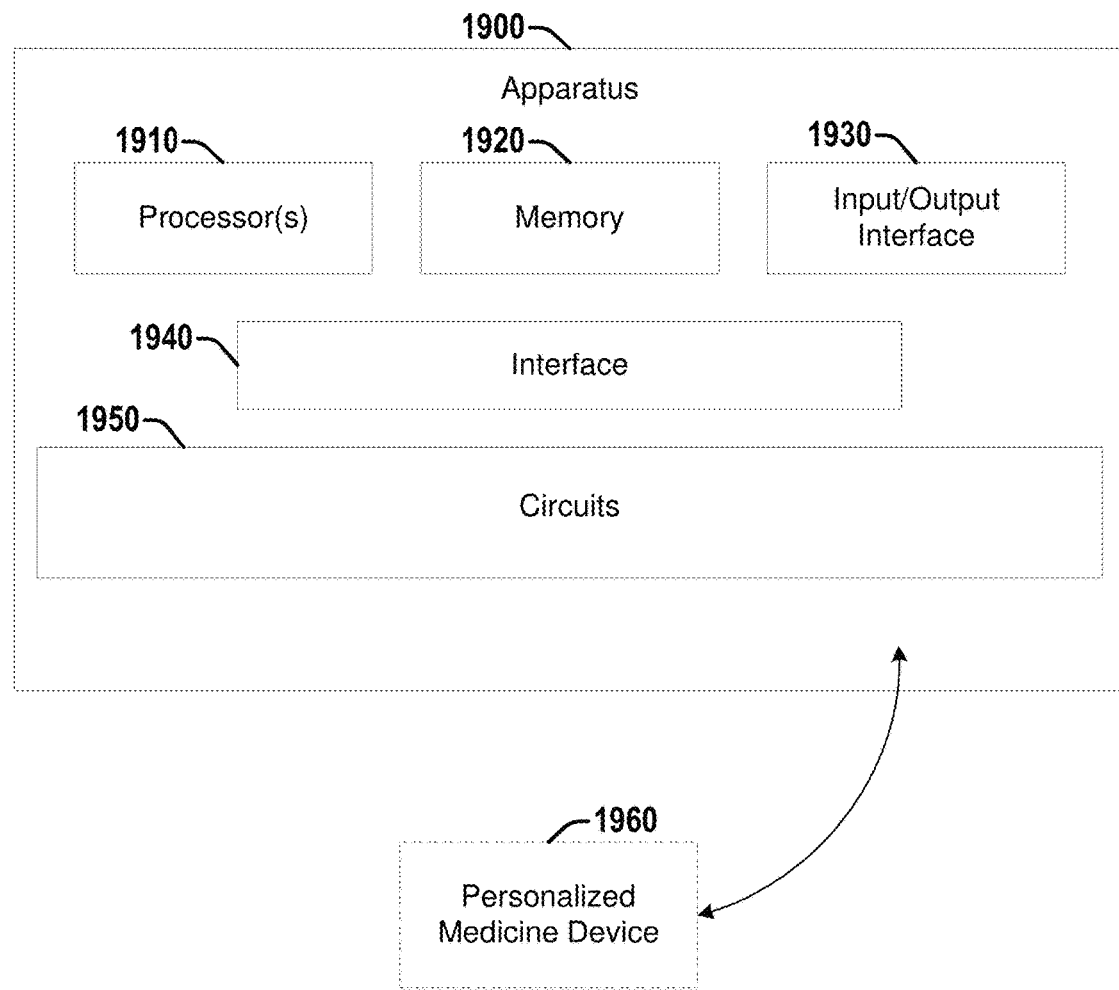
FIG. 19 illustrates a diagram of an example apparatus that can facilitate training and/or employing deep learning model(s) to segment selected type(s) of histological primitives on histological images stained with selected stain type(s), according to various embodiments discussed herein.

Referring to FIG. 19, illustrated is a diagram of an example apparatus 1900 that can facilitate training and/or employing deep learning model(s) to segment selected type(s) of histological primitives on histological images stained with selected stain type(s), according to various embodiments discussed herein. Apparatus 1900 can be configured to perform various techniques discussed herein, for example, various operations discussed in connection with sets of operations 100 or 200. Apparatus 1900 can comprise one or more processors 1910 and memory 1920. Processor(s) 1910 can, in various embodiments, comprise circuitry such as, but not limited to, one or more single-core or multi-core processors. Processor(s) 1910 can include any combination of general-purpose processors and dedicated processors (e.g., graphics processors, application processors, etc.). The processor(s) can be coupled with and/or can comprise memory (e.g., of memory 1920) or storage and can be configured to execute instructions stored in the memory 1920 or storage to enable various apparatus, applications, or operating systems to perform operations and/or methods discussed herein. Memory 1920 can be configured to store one or more digitized histological images (e.g., obtained via optical microscopy, etc.) of one or more renal biopsies (e.g., for training, diagnosing, and/or prognosticating). Each of the image(s) can comprise a plurality of pixels or voxels, each pixel or voxel having an associated intensity. Memory 1920 can be further configured to store additional data involved in performing operations discussed herein, such as for training and/or employing a deep learning model to segment a selected type of histological primitive on histological image(s) stained with a selected stain type, as discussed in greater detail herein.

Apparatus 1900 can also comprise an input/output (I/O) interface 1930 (e.g., associated with one or more I/O devices), a set of circuits 1950, and an interface 1940 that connects the processor(s) 1910, the memory 1920, the I/O interface 1930, and the set of circuits 1950. I/O interface 1930 can be configured to transfer data between memory 1920, processor 1910, circuits 1950, and external devices, for example, a medical imaging device (e.g., optical microscope, etc.), and/or one or more remote devices for receiving inputs and/or providing outputs to a clinician, patient, etc., such as optional personalized medicine device 1960.

The processor(s) 1910 and/or one or more circuits of the set of circuits 1950 can perform one or more acts associated with a method or set of operations discussed herein, such as set of operations 100 and/or 200. In various embodiments, different acts (e.g., different operations of a set of operations) can be performed by the same or different processor(s) 1910 and/or one or more circuits of the set of circuits 1950.

Apparatus 1900 can optionally further comprise personalized medicine device 1960. Apparatus 1900 can be configured to provide the segmentation of selected type(s) of histological primitives or a diagnosis/prognosis determined therefrom for a patient, and/or other data to personalized medicine device 1960. Personalized medicine device 1960 may be, for example, a computer assisted diagnosis (CADx) system or other type of personalized medicine device that can be used to facilitate monitoring and/or treatment of an associated medical condition. In some embodiments, processor(s) 1910 and/or one or more circuits of the set of circuits 1950 can be further configured to control personalized medicine device 1960 to display the segmentation and/or diagnosis/prognosis for the patient or other data on a computer monitor, a smartphone display, a tablet display, or other displays.

Examples herein can include subject matter such as an apparatus, an optical microscope, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing a first histological image of a renal biopsy comprising a first type of histological primitives, wherein the first histological image is stained with a first type of stain; providing the first histological image to a first deep learning model trained based on the first type of histological primitive and the first type of stain; and receiving a first output image from the first deep learning model, wherein the first type of histological primitives is segmented in the first output image.

Example 2 comprises the subject matter of any variation of any of example(s) 1, wherein the operations further comprise: accessing a second histological image of the renal biopsy comprising a second type of histological primitives, wherein the second histological image is stained with a second type of stain; providing the second histological image to a second deep learning model trained based on the second type of histological primitive and the second type of stain; and receiving a second output image from the second deep learning model, wherein the second type of histological primitives is segmented in the second output image, wherein the second deep learning model is different from the first deep learning model, and at least one of: the second type of histological primitives is different from the first type of histological primitives, or the second type of stain is different from the first type of stain.

Example 3 comprises the subject matter of any variation of any of example(s) 1-2, wherein the first type of stain is one of: hematoxylin and eosin (H&E), Jones and periodic acid-methenamine silver (SIL), periodic acid Schiff (PAS), or Masson trichrome (TRI).

Example 4 comprises the subject matter of any variation of any of example(s) 1-3, wherein the first type of histological primitives is one of: glomerular tufts, glomerular units, proximal tubular segments, distal tubular segments, peritubular capillaries, or arteries and arterioles.

Example 5 comprises the subject matter of any variation of any of example(s) 4, wherein the first histological image has an optimal magnification for the first type of histological primitives, and wherein the first deep learning model was trained on a training set of images having the optimal magnification.

Example 6 comprises the subject matter of any variation of any of example(s) 5, wherein the optimal magnification is 5× when the first type of histological primitives is glomerular tufts, wherein the optimal magnification is 5× when the first type of histological primitives is glomerular units, wherein the optimal magnification is 10× when the first type of histological primitives is proximal tubular segments, wherein the optimal magnification is 10× when the first type of histological primitives is distal tubular segments, wherein the optimal magnification is 40× when the first type of histological primitives is peritubular capillaries, and wherein the optimal magnification is 10× when the first type of histological primitives is arteries and arterioles.

Example 7 comprises the subject matter of any variation of any of example(s) 1-6, wherein the deep learning model is a convolutional neural network (CNN).

Example 8 comprises the subject matter of any variation of any of example(s) 7, wherein the deep learning model has a U-Net architecture.

Example 9 is a non-transitory computer-readable medium storing computer-executable instructions that, when executed, cause a processor to perform operations, comprising: accessing a training set comprising a plurality of histological images of renal biopsies, wherein each histological image of the training set comprises a selected type of histological primitives, wherein each histological image of the training set is stained with a selected type of stain, and wherein each histological image of the training set has one or more associated ground truth annotations that segment the selected type of histological primitive on that histological image; for each histological image of the training set: providing that histological image and the one or more associated ground truth annotations to a deep learning model; and based on the plurality of histological images and the one or more associated ground truth annotations for each histological image of the plurality of histological images, training the deep learning model to segment the selected type of histological primitives from an additional histological image stained with the selected type of stain.

Example 10 comprises the subject matter of any variation of any of example(s) 9, wherein the selected type of stain is one of: hematoxylin and eosin (H&E), Jones and periodic acid-methenamine silver (SIL), periodic acid Schiff (PAS), or Masson trichrome (TRI).

Example 11 comprises the subject matter of any variation of any of example(s) 9-10, wherein the selected type of histological primitives is one of: glomerular tufts, glomerular units, proximal tubular segments, distal tubular segments, peritubular capillaries, or arteries and arterioles.

Example 12 comprises the subject matter of any variation of any of example(s) 11, wherein each histological image of the training set has an optimal magnification for the selected type of histological primitives.

Example 13 comprises the subject matter of any variation of any of example(s) 12, wherein the optimal magnification is 5× when the selected type of histological primitives is glomerular tufts, wherein the optimal magnification is 5× when the selected type of histological primitives is glomerular units, wherein the optimal magnification is 10× when the selected type of histological primitives is proximal tubular segments, wherein the optimal magnification is 10× when the selected type of histological primitives is distal tubular segments, wherein the optimal magnification is 40× when the selected type of histological primitives is peritubular capillaries, and wherein the optimal magnification is 10× when the selected type of histological primitives is arteries and arterioles.

Example 14 comprises the subject matter of any variation of any of example(s) 9-13, wherein the total number of ground truth annotations associated with the plurality of histological images of the training set is selected based at least in part on a threshold performance target for the deep learning network and on the selected type of histological primitives.

Example 15 comprises the subject matter of any variation of any of example(s) 9-14, wherein the deep learning model is a convolutional neural network (CNN).

Example 16 comprises the subject matter of any variation of any of example(s) 15, wherein the deep learning model has a U-Net architecture.

Example 17 comprises the subject matter of any variation of any of example(s) 9-16, wherein the operations further comprise augmenting each histological image of the training set based on one or more of an affine augmentation, a randomized color augmentation, an elastic transformation, or a grid distortion.

Example 18 is an apparatus, comprising: memory configured to store a first histological image of a renal biopsy comprising a first type of histological primitives, wherein the first histological image is stained with a first type of stain; one or more processors configured to: provide the first histological image to a first deep learning model trained based on the first type of histological primitive and the first type of stain; and receive a first output image from the first deep learning model, wherein the first type of histological primitives is segmented in the first output image.

Example 19 comprises the subject matter of any variation of any of example(s) 18, wherein the one or more processors are further configured to: access a second histological image of the renal biopsy comprising a second type of histological primitives, wherein the second histological image is stained with a second type of stain; provide the second histological image to a second deep learning model trained based on the second type of histological primitive and the second type of stain; and receive a second output image from the second deep learning model, wherein the second type of histological primitives is segmented in the second output image, wherein the second deep learning model is different from the first deep learning model, and at least one of: the second type of histological primitives is different from the first type of histological primitives, or the second type of stain is different from the first type of stain.

Example 20 comprises the subject matter of any variation of any of example(s) of claim 18-19, wherein the first type of stain is one of: hematoxylin and eosin (H&E), Jones and periodic acid-methenamine silver (SIL), periodic acid Schiff (PAS), or Masson trichrome (TRI).

Example 21 comprises the subject matter of any variation of any of example(s) 18-20, wherein the first type of histological primitives is one of: glomerular tufts, glomerular units, proximal tubular segments, distal tubular segments, peritubular capillaries, or arteries and arterioles.

Example 22 comprises the subject matter of any variation of any of example(s) 21, wherein the first histological image has an optimal magnification for the first type of histological primitives, and wherein the first deep learning model was trained on a training set of images having the optimal magnification.

Example 23 comprises the subject matter of any variation of any of example(s) 22, wherein the optimal magnification is 5× when the first type of histological primitives is glomerular tufts, wherein the optimal magnification is 5× when the first type of histological primitives is glomerular units, wherein the optimal magnification is 10× when the first type of histological primitives is proximal tubular segments, wherein the optimal magnification is 10× when the first type of histological primitives is distal tubular segments, wherein the optimal magnification is 40× when the first type of histological primitives is peritubular capillaries, and wherein the optimal magnification is 10× when the first type of histological primitives is arteries and arterioles.

Example 24 comprises the subject matter of any variation of any of example(s) 18-23, wherein the deep learning model is a convolutional neural network (CNN).

Example 25 comprises the subject matter of any variation of any of example(s) 24, wherein the deep learning model has a U-Net architecture.

Example 26 comprises an apparatus comprising means for executing any of the described operations of examples 1-25.

Example 27 comprises a machine readable medium that stores instructions for execution by a processor to perform any of the described operations of examples 1-25.

Example 28 comprises an apparatus comprising: a memory; and one or more processors configured to: perform any of the described operations of examples 1-25.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
   accessing a first histological image of a renal biopsy comprising a first type of histological primitives, wherein the first histological image is stained with a first type of stain;
   providing the first histological image to a first deep learning model trained based on the first type of histological primitive and the first type of stain;
   operating the first deep learning model to segment the first histological image to generate a first output image from the first deep learning model, wherein the first type of histological primitives is segmented in the first output image;
   accessing a second histological image of a second renal biopsy comprising a second type of histological primitives, wherein the second histological image is stained with a second type of stain;
   providing the second histological image to a second deep learning model trained based on the second type of histological primitive and the second type of stain; and
   operating the second deep learning model to segment the second histological image to generate a second output image from the second deep learning model, wherein the second type of histological primitives is segmented in the second output image,
   wherein the second deep learning model is different from the first deep learning model, and at least one of:
      the second type of histological primitives is different from the first type of histological primitives, or
      the second type of stain is different from the first type of stain.

2. The non-transitory computer-readable medium of claim 1, wherein the first type of stain is one of: hematoxylin and eosin (H&E), Jones and periodic acid-methenamine silver (SIL), periodic acid Schiff (PAS), or Masson trichrome (TRI).

3. The non-transitory computer-readable medium of claim 1, wherein the first type of histological primitives is one of: glomerular tufts, glomerular units, proximal tubular segments, distal tubular segments, peritubular capillaries, or arteries and arterioles.

4. The non-transitory computer-readable medium of claim 3, wherein the first histological image has an optimal magnification for the first type of histological primitives, and wherein the first deep learning model was trained on a training set of images having the optimal magnification.

5. The non-transitory computer-readable medium of claim 4, wherein the optimal magnification is 5× when the first type of histological primitives is the glomerular tufts, wherein the optimal magnification is 5× when the first type of histological primitives is the glomerular units, wherein the optimal magnification is 10× when the first type of histological primitives is the proximal tubular segments, wherein the optimal magnification is 10× when the first type of histological primitives is the distal tubular segments, wherein the optimal magnification is 40× when the first type of histological primitives is the peritubular capillaries, and wherein the optimal magnification is 10× when the first type of histological primitives is the arteries and arterioles.

6. The non-transitory computer-readable medium of claim 1, wherein the first deep learning model is a convolutional neural network (CNN).

7. The non-transitory computer-readable medium of claim 6, wherein the first deep learning model has a U-Net architecture.

8. An apparatus, comprising:
   memory configured to store a first histological image of a renal biopsy comprising a first type of histological primitives, wherein the first histological image is stained with a first type of stain;
   one or more processors configured to:
      provide the first histological image to a first deep learning model trained based on the first type of histological primitive and the first type of stain; and
      receive a first output image from the first deep learning model, wherein the first type of histological primitives is segmented in the first output image;
      access a second histological image of a second renal biopsy comprising a second type of histological primitives, wherein the second histological image is stained with a second type of stain;
      provide the second histological image to a second deep learning model trained based on the second type of histological primitive and the second type of stain; and
      receive a second output image from the second deep learning model, wherein the second type of histological primitives is segmented in the second output image,
   wherein the second deep learning model is different from the first deep learning model, and at least one of:
      the second type of histological primitives is different from the first type of histological primitives, or
      the second type of stain is different from the first type of stain.

9. The apparatus of claim 8, wherein the first type of stain is one of: hematoxylin and eosin (H&E), Jones and periodic acid-methenamine silver (SIL), periodic acid Schiff (PAS), or Masson trichrome (TRI).

10. The apparatus of claim 8, wherein the first type of histological primitives is one of: glomerular tufts, glomerular units, proximal tubular segments, distal tubular segments, peritubular capillaries, or arteries and arterioles.

11. The apparatus of claim 10, wherein the first histological image has an optimal magnification for the first type of histological primitives, and wherein the first deep learning model was trained on a training set of images having the optimal magnification.

12. The apparatus of claim 11, wherein the optimal magnification is 5× when the first type of histological primitives is the glomerular tufts, wherein the optimal magnification is 5× when the first type of histological primitives is the glomerular units, wherein the optimal magnification is 10× when the first type of histological primitives is the proximal tubular segments, wherein the optimal magnification is 10× when the first type of histological primitives is the distal tubular segments, wherein the optimal magnification is 40× when the first type of histological primitives is the peritubular capillaries, and wherein the optimal magnification is 10× when the first type of histological primitives is the arteries and arterioles.

13. The apparatus of claim 8, wherein the first deep learning model is a convolutional neural network (CNN).

14. The apparatus of claim 13, wherein the first deep learning model has a U-Net architecture.

15. The apparatus of claim 8, wherein the first histological image is from a pediatric patient.

16. The apparatus of claim 8, wherein the first type of stain is a periodic acid Schiff (PAS) or a Masson trichrome (TRI) and the first type of histological primitives is an artery or an arteriole.

17. A non-transitory computer-readable medium storing computer-executable instructions that, when executed, cause a processor to perform operations, comprising:
- providing a first histological image of a first renal biopsy stained with a first type of stain and comprising a first type of histological primitives to a first deep learning model, the first deep learning model trained based on the first type of histological primitive, the first type of stain, and a first ground truth;
- receiving a first output image from the first deep learning model, wherein the first type of histological primitives is segmented in the first output image;
- providing a second histological image of a second renal biopsy stained with a second type of stain and comprising a second type of histological primitives to a second deep learning model, the second deep learning model trained based on the second type of histological primitive, the second type of stain, and a second ground truth; and
- receiving a second output image from the second deep learning model, wherein the second type of histological primitives is segmented in the second output image.

18. The non-transitory computer-readable medium of claim 17, wherein the first type of stain and the second type of stain are different ones of a group including hematoxylin and eosin (H&E), Jones and periodic acid-methenamine silver (SIL), periodic acid Schiff (PAS), or Masson trichrome (TRI).

19. The non-transitory computer-readable medium of claim 17, wherein the first type of histological primitives and the second type of histological primitives are different ones of a group including glomerular tufts, glomerular units, proximal tubular segments, distal tubular segments, peritubular capillaries, or arteries and arterioles.

20. The non-transitory computer-readable medium of claim 17, wherein the first type of stain is periodic acid Schiff (PAS) and the first type of histological primitives is peritubular capillaries.

21. The non-transitory computer-readable medium of claim 17, wherein the first deep learning model and the second deep learning model are comprised within a same deep learning pipeline.

22. The non-transitory computer-readable medium of claim 17, wherein the first histological image is cropped from an original whole slide image.

23. The non-transitory computer-readable medium of claim 17, wherein the first histological image and the second histological image are taken from patients with minimal change disease.

24. The non-transitory computer-readable medium of claim 17, wherein the first ground truth and the second ground truth respectively comprise a binary mask.

25. The non-transitory computer-readable medium of claim 17, wherein the first histological image and the second histological image are part of a dataset comprising a plurality of whole slide images per biopsy, the plurality of whole slide images having different types of stain types.

* * * * *

UNITED STATES PATENT AND TRADEMARK OFFICE
CERTIFICATE OF CORRECTION

PATENT NO. : 11,645,753 B2
APPLICATION NO. : 17/032617
DATED : May 9, 2023
INVENTOR(S) : Anant Madabhushi et al.

Page 1 of 1

It is certified that error appears in the above-identified patent and that said Letters Patent is hereby corrected as shown below:

In the Specification

Column 1, Lines 19-22; please replace "This invention was made with government support under the grant DK747033 awarded by the National Institute of Diabetes, Digestive and Kidney Disorders. The government has certain rights in the invention." With --This invention was made with government support under DK747033 awarded by the National Institutes of Health. The government has certain rights in the invention.--

Signed and Sealed this
Second Day of September, 2025

Coke Morgan Stewart
*Acting Director of the United States Patent and Trademark Office*